(12) United States Patent
Hoppes et al.

(10) Patent No.: US 8,206,870 B2
(45) Date of Patent: Jun. 26, 2012

(54) LONG-LIFE MEMBRANE ELECTRODE ASSEMBLIES WITH GASKET AND FRAME

(75) Inventors: Glen Hoppes, Frankfurt (DE); Raymond Puffer, Watervliet, NY (US)

(73) Assignee: BASF Fuel Cell GmbH, Frankfurt (DE)

( * ) Notice: Subject to any disclaimer, the term of this patent is extended or adjusted under 35 U.S.C. 154(b) by 1168 days.

(21) Appl. No.: 11/573,107

(22) PCT Filed: Aug. 5, 2005

(86) PCT No.: PCT/EP2005/008488
§ 371 (c)(1),
(2), (4) Date: May 24, 2007

(87) PCT Pub. No.: WO2006/013108
PCT Pub. Date: Feb. 9, 2006

(65) Prior Publication Data
US 2010/0068585 A1    Mar. 18, 2010

(51) Int. Cl.
*H01M 8/24* (2006.01)
(52) U.S. Cl. ........ 429/463; 429/470; 429/512; 429/482; 429/483
(58) Field of Classification Search .................. 429/463, 429/512, 470, 483, 482
See application file for complete search history.

(56) References Cited

U.S. PATENT DOCUMENTS

| | | | |
|---|---|---|---|
| 4,191,618 A | 3/1980 | Coker et al. | |
| 4,212,714 A | 7/1980 | Coker et al. | |
| 4,333,805 A | 6/1982 | Davidson et al. | |
| 5,464,700 A | 11/1995 | Steck et al. | |
| 6,720,103 B1 * | 4/2004 | Nagai | 429/463 |
| 7,655,337 B2 * | 2/2010 | Kaye | 429/424 |
| 2004/0096734 A1 * | 5/2004 | Calundann et al. | 429/137 |
| 2004/0137303 A1 * | 7/2004 | Kuroki et al. | 429/35 |

FOREIGN PATENT DOCUMENTS

| | | |
|---|---|---|
| DE | 19509748 A1 | 10/1996 |
| DE | 19509749 A1 | 10/1996 |
| DE | 19757492 A1 | 7/1999 |
| DE | 10028395 A1 | 12/2000 |
| DE | 10052242 A1 | 5/2002 |
| DE | 10109829 A1 | 9/2002 |
| DE | 10110752 A1 | 9/2002 |
| DE | 10140147 A1 | 3/2003 |

(Continued)

*Primary Examiner* — Barbara Gilliam
*Assistant Examiner* — Zachary Best
(74) *Attorney, Agent, or Firm* — Hammer & Associates, P.C.

(57) ABSTRACT

A membrane electrode assembly comprising two electrode separated by a polymer electrolyte membrane wherein the surfaces of the membrane are in contact with the electrodes so that the first electrode partially or totally covers the front of the membrane and the second electrode partially or totally covers the back of the membrane; two gasket layers wherein the first gasket layer partially covers the front of the membrane and/or the first electrode and the second gasket layer partially covers the back of the membrane and/or the second electrode the assembly also comprises a second gasket material on the front of the first gasket layer and on the back of the second gasket layer; each of the gasket layers comprises at least one recess; the second gasket material on the front of the first gasket layer is in contact with the second gasket material on the back of the second gasket layer.

20 Claims, 6 Drawing Sheets

FOREIGN PATENT DOCUMENTS

| | | |
|---|---|---|
| DE | 10209419 A1 | 9/2003 |
| DE | 10213540 A1 | 2/2004 |
| DE | 10235360 A1 | 2/2004 |
| DE | 10246459 A1 | 4/2004 |
| DE | 10246461 A1 | 4/2004 |
| EP | 1073690 A1 | 10/1999 |
| EP | 1391956 A | 2/2004 |
| JP | A-2001-196082 | 7/2001 |
| WO | WO 92/15121 | 9/1992 |
| WO | WO 96/13872 | 5/1996 |
| WO | WO 97/20358 A | 6/1997 |
| WO | WO 00/26982 | 5/2000 |
| WO | WO 00/44816 | 8/2000 |
| WO | WO 01/18894 A2 | 3/2001 |
| WO | WO 01/89016 A | 11/2001 |

\* cited by examiner

LONG-LIFE MEMBRANE ELECTRODE ASSEMBLIES WITH GASKET AND FRAME

This national stage application claims priority through co-pending PCT Application No. PCT/EP2005/008488 filed Aug. 5, 2005 and (at the filing of the PCT application) U.S. Provisional Application Ser. No. 60/620,747 filed Oct. 21, 2004.

The present invention relates to long-life membrane electrode assemblies and fuel cells comprising two electrochemically active electrodes separated by a polymer electrolyte membrane.

In polymer electrolyte membrane (PEM) fuel cells the proton-conducting membranes used are nowadays almost without exception polymers modified with sulfonic acids. The polymers employed are predominantly perfluorinated polymers. One prominent example is Nafion™ from DuPont de Nemours, Willmington USA. Proton conduction requires a relatively high water content in the membrane, typically of 4-20 molecules of water per sulfonic acid group. The necessary water content, but also the stability of the polymer in conjunction with acidic water and the reaction gases—hydrogen and oxygen—limits the operating temperature of the PEM fuel cell stack to 80-100° C. The operation temperatures may be increased to temperatures >120° C. by the use of superatmospheric pressure. Higher operating temperatures are impossible to realize without a loss of fuel cell performance. At temperatures which for a given pressure level lie above the dew point of water the membrane dries out completely and the fuel cell no longer supplies electrical energy, since the resistance of the membrane climbs to levels so high that there is no longer any significant current flow.

A membrane electrode assembly with integrated seal which is based on the technology outlined above is described for example in U.S. Pat. No. 5,464,700. In the outer region of that membrane electrode assembly, on the areas of the membrane not covered by the electrodes, there are films of elastomers which at the same time represent the seal to the separator plates and to the exterior.

That measure enables a saving to be achieved in terms of very costly membrane material. Further advantages obtained by virtue of this construction relates to the contamination of the membrane. An improvement in long-term stability is not provided in U.S. Pat. No. 5,464,700. This is also apparent from the very low operating temperatures. In the description of the invention depicted in U.S. Pat. No. 5,464,700 there is a reference to the fact that the operating temperature of the cell is limited to 80° C. maximum. Elastomers are also generally suitable only for long-term service temperatures up to 100° C.

For technical reasons associated with the system, however, operating temperatures higher than 100° C. in the fuel cell are desirable. The activity of the precious-metal-based catalysts contained in the membrane electrode assembly (membrane electrode assembly) is substantially better at high operating temperatures.

Especially when what are called reformates, comprising hydrocarbons, are used, the reformer gas contains significant quantities of carbon monoxide, which must normally be removed by complex gas processing or gas purification. At high operating temperatures there is a rise in the tolerance of the catalysts for the CO impurities.

Furthermore, heat is produced during the operation of fuel cells. Cooling of these systems to below 80° C., however, can be very complicated. Depending on performance output, the cooling devices can be made significantly more simple in design. That means that in fuel cell systems which are operated at temperatures above 100° C. the waste heat can be made clearly better usable and thus the fuel cell system efficiency can be increased.

In order to achieve these temperatures, membranes featuring new conductivity mechanisms are generally used. One approach to this is the use of membranes which exhibit electrical conductivity without the use of water. The first promising development in this direction is outlined in the publication WO 96/13872.

That publication also describes a first method of producing membrane electrode assemblies: two electrodes are pressed onto the membrane, each of them covering only part of the two principal faces of the membrane. A PTFE seal is pressed onto the remaining free part of the principal faces of the membrane in the cell, so that the gas spaces of anode and cathode are sealed from one another and from the environment.

Another high-temperature fuel cell is disclosed in the publication JP-A-2001-196082. Depicted therein is an electrode membrane assembly which is provided with a polyimide seal. A problem with this construction, however, is that sealing requires two membranes with a polyimide gasket between them. Since the chosen thickness of the membrane must be as small as possible for technical reasons, the thickness of the gasket between the two membranes described in JP-A-2001-196082 is extremely limited. In long-term tests it has been found that a construction of this kind is likewise not stable for a period of more than 1000 hours.

DE 10235360 discloses a membrane electrode assembly which comprises polyimide layers as seals. These polyimide layers may optionally comprise fluoropolymers in order to increase the long-term stability of the membrane electrode assembly.

In general the membrane electrode assemblies mentioned above are combined with planar separator plates comprising channels for a gas stream. Since in part the membranes have a greater thickness than the seals described above, a further seal which is usually manufactured from PTFE is inserted between the seal of the membrane electrode assemblies and the separator plates.

In the meantime it has been observed that the lifetime of the fuel cells mentioned above is limited.

Therefore it has been an object of the present invention to provide improved membrane electrode assemblies and fuel cells operated with these membrane electrode assemblies which preferably exhibit the following properties:

The fuel cells should have a lifetime as long as possible.

It should be possible to operate the fuel cells at operating temperatures as high as possible in particular above of 100° C.

The energy output of the single cells should be at the same or an improved level over a period as long as possible.

After a long operation period the fuel cells should have a rest voltage as high as possible and a gas cross over as low as possible. Furthermore it should be possible to operate the fuel cells with a stoichiometry as low as possible.

An additional fuel gas humidification should be avoided as much as possible.

The membrane electrode assemblies should be able to resist to permanent or changing pressure differences between anode and cathode in the best possible way.

In particular the membrane electrode assemblies should be robust against different operating conditions (T, p, geometry etc.) in order to increase the general reliability in the best possible way.

It should be possible to prepare the membrane electrode assemblies in a simple and low-cost way and in large scale.

An over compression of the membrane electrode assembly should be prevented in the best possible way.

It should be possible to seal the membrane electrode assembly with separator plates in the best possible way.

The membrane electrode assemblies should have a more rigid and robust design which is less susceptible to misuse and mis-handling.

The membrane electrode assemblies should allow an easier assembly of the fuel cell stack.

These objects are solved by membrane electrode assemblies having all features of claim 1.

Therefore the present invention refers to a membrane electrode assembly comprising
a) two electrochemically active electrodes separated by a polymer electrolyte membrane wherein the surfaces of the polymer electrolyte membrane are in contact with the electrodes in such a way that the first electrode partially or totally covers the front of the polymer electrolyte membrane and the second electrode partially or totally covers the back of the polymer electrolyte membrane;
b) two gasket layers made of a first gasket material wherein the first gasket layer partially covers the front of the polymer electrolyte membrane and/or the first electrode and the second gasket layer partially covers the back of the polymer electrolyte membrane and/or the second electrode; wherein
the membrane electrode assembly also comprises a second gasket material on the front of the first gasket layer and on the back of the second gasket layer;
each of the gasket layers comprises at least one recess;
the second gasket material on the front of first gasket layer is in contact with the gasket material on the back of the second gasket layer.

Polymer electrolyte membranes suitable for the purposes of the present invention are known per se and in principle not limited. All kind of proton conducting membranes are suitable. Membranes used for this purpose are preferably membranes comprising acids, wherein the acids can be covalently bonded to polymers. Furthermore a sheet-like material can be doped with an acid, to form a suitable membrane. In addition gels, in particular polymer gels, can be used as a membrane. Polymer membranes especially suitable for the present purposes are described in the DE 102 464 61.

These membranes can be obtained by swelling of two-dimensional materials, e.g. a polymer film, with a liquid comprising acidic compounds, or by the preparation of a mixture of polymers and acidic compounds and subsequent forming of a membrane by forming a two-dimensional object and subsequent hardening in order to form a membrane.

Suitable polymers comprises polyolefins, such as polychloroprene, polyacetylene, polyphenylene, poly-p-xylylene, polyaryl methylene, polystyrene, polymethyl styrene, polyvinyl alcohol, polyvinyl acetate, polyvinyl ether, polyvinyl amine, poly-N-vinyl acetamide, polyvinyl imidazole, polyvinyl carbazole, polyvinyl pyrrolidone, polyvinyl pyridine, polyvinyl chloride, polyvinylidene chloride, polytetrafluoroethylene (PTFE), polyhexafluoro propylene, copolymers of PTFE with hexafluoropropylene, with perfluoropropylene vinylether, with trifluoro nitrosomethane, with carbalkoxy-perfluoro alkoxy vinylether, polychloro trifluoro ethylene, polyvinyl fluoride, polyvinylidene fluoride, polyacrolein, polyacrylic fiber amide, polyacrylonitrile, polycyanoacrylates, polymethacrylimide, cycloolefinic copolymers, in particular of norbornene;

polymers comprising C—O-bonds in the polymer backbone, for example polyacetal, polyoxymethylene, polyether, polypropylene oxide, polyepichlorhydrin, polytetrahydrofurane, polyphenylene oxide, polyether ketone, polyester, in particular polyglycolic acid, polyethylene terephthalate, polybutylene terephthalate, polyhydroxy benzoate, polyhydroxy propionic acid, polypivalolacton, polycaprolacton, poly maleic acid, polycarbonate;

polymers comprising C—S bonds in the polymer backbone, for example polysulfid ether, polyphenylen sulfide, polysulfones, polyether sulfone;

polymers comprising C—N bonds in the polymer backbone, for example polyimines, polyiso cyanides, polyether imine, polyether imide, polyanilin, polyaramide, polyamides, polyhydrazides, polyurethanes, polyimides, polyazoles, polyazol ether ketone, polyazines;

liquid-crystalline polymers, in particular Vectra™ as well as inorganic polymers, for example polysilanes, polycarbosilanes, polysiloxanes, polysilicic acid, polysilicates, silicones, polyphosphazenes and polythiazyl.

In this context basic polymers are preferred. In particular this holds for membranes doped with an acid. Suitable basic polymer membranes doped with mineral acid include virtually all known polymer membranes in which the protons can be transported. Preference is given here to acids which are able to convey protons without additional water, by means for example of what is termed the Grotthus mechanism.

As the basic polymer for the purposes of the present invention it is preferred to use a basic polymer having at least one nitrogen, oxygen or sulphur atom, preferably at least one nitrogen atom, in a repeating unit. In addition basic polymers which comprise at least a heteroaryl group are also preferred.

According to one preferred embodiment the repeating unit in the basic polymer comprises an aromatic ring having at least one nitrogen atom. The aromatic ring is preferably a five- or six-membered ring having one to three nitrogen atoms, which may be fused to another ring, in particular another aromatic ring.

According to a special aspect of the present invention high temperature stable polymers are used which contain at least one nitrogen, oxygen and/or sulphur atom in one or in different repeating units.

A high temperature stable polymer in the sense of the present invention is a polymer that can be permanently used as a polymeric electrolyte in a fuel cell at temperatures above 120° C. Permanently means, that a membrane in accordance with the present invention can be operated at least 100 hours, preferably at least 500 hours, at least 80° C., preferably at at least 120° C., particularly at least 160° C., without a voltage decrease measurable in accordance with WO 01/18894 A2 of more than 50%, based on the starting voltage.

According to the present invention all polymers mentioned above can be used separately or as a mixture (blend). Preferred blends contain polyazoles and/or polysulfones in particular. The preferred blend components are in this case polyether sulfone, polyether ketone and polymers modified with sulphonic acid groups, as described in the german patent applications DE 100 522 42 and DE 102 464 61. By the use of blends the mechanical properties can be improved and the costs of the materials can be reduced.

According to one preferred embodiment of the present invention polymer blends are used comprising at least one basic polymer and at least one acidic polymer wherein the weight ratio of the basic polymer to the acidic polymer is preferably 1:99 to 99:1. These polymer blends are called acidic basic polymer blends. Acidic polymers especially preferred in that context comprise polymers comprising sulfonic acid groups and/or phosphonic acid groups. Especially preferred polymer blends are described in the patent application EP 1 073 690 A1, for example.

A particularly preferred group of basic polymers is that of the polyazoles. A basic polymer based on polyazole contains repeating azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

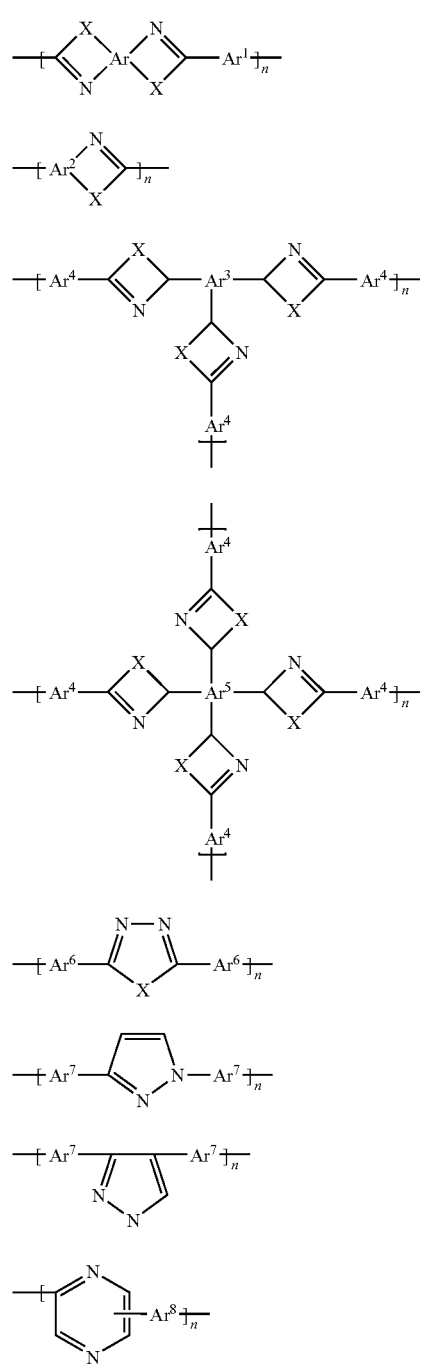
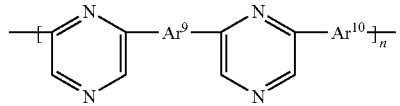
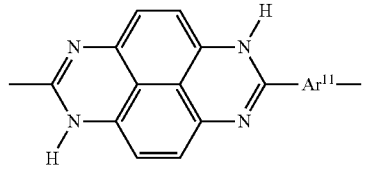
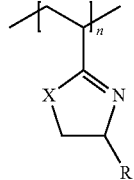
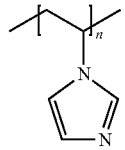
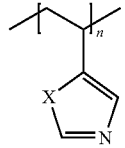
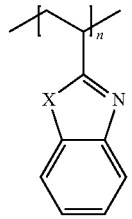
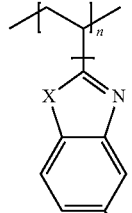
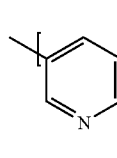
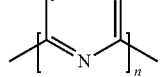

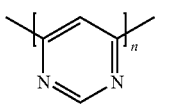

(XVIII)

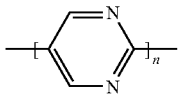

(XIX)

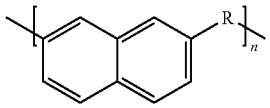

(XX)

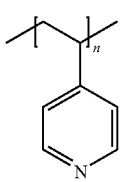

(XXI)

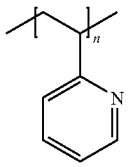

(XXII)

in which

Ar is identical or different at each occurrence and is a tetravalent aromatic or heteroaromatic group which may be monocyclic or polycyclic, $Ar^1$ is identical or different at each occurrence and is a divalent aromatic or heteroaromatic group which may be monocyclic or polycyclic, $Ar^2$ is identical or different at each occurrence and is a divalent or trivalent aromatic or heteroaromatic group which may be monocyclic or polycyclic, $Ar^3$ is identical or different at each occurrence and is a trivalent aromatic or heteroaromatic group which may be monocyclic or polycyclic, $Ar^4$ is identical or different at each occurrence and is a trivalent aromatic or heteroaromatic group which may be monocyclic or polycyclic, $Ar^5$ is identical or different at each occurrence and is a tetravalent aromatic or heteroaromatic group which may be monocyclic or polycyclic, $Ar^6$ is identical or different at each occurrence and is a divalent aromatic or heteroaromatic group which may be monocyclic or polycyclic, $Ar^7$ is identical or different at each occurrence and is a divalent aromatic or heteroaromatic group which may be monocyclic or polycyclic, $Ar^8$ is identical or different at each occurrence and is a trivalent aromatic or heteroaromatic group which may be monocyclic or polycyclic, $Ar^9$ is identical or different at each occurrence and is a divalent or trivalent or tetravalent aromatic or heteroaromatic group which may be monocyclic or polycyclic, $Ar^{10}$ is identical or different at each occurrence and is a divalent or trivalent aromatic or heteroaromatic group which may be monocyclic or polycyclic, $Ar^{11}$ is identical or different at each occurrence and is a divalent aromatic or heteroaromatic group which may be monocyclic or polycyclic, X is identical or different at each occurrence and is oxygen, sulfur or an amino group which carries a hydrogen atom, a group containing 1-20 carbon atoms, preferably a branched or nonbranched alkyl or alkoxy group, or an aryl group as a further radical, R is identical or different at each occurrence and is hydrogen, an alkyl group and an aromatic group, with the proviso that R in formula XX is a divalent group, and n and m are each an integer greater than or equal to 10, preferably greater than or equal to 100.

Preferred aromatic or heteroaromatic groups derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, acridine, phenazine, benzoquinoline, phenoxazine, phenothiazine, acridizine, benzopteridine, phenanthroline and phenanthrene, which if desired may also be substituted.

The substitution pattern of $Ar^1$, $Ar^4$, $Ar^6$, $Ar^7$, $Ar^8$, $Ar^9$, $Ar^{10}$ and $Ar^{11}$ is arbitrary; in the case of phenylene, for example, $Ar^1$, $Ar^4$, $Ar^6$, $Ar^7$, $Ar^8$, $Ar^9$, $Ar^{10}$ or $Ar^{11}$ can be ortho-, meta- and para-phenylene. Particularly preferred groups derive from benzene and biphenylene, which if desired may also be substituted.

Preferred alkyl groups are short-chain alkyl groups having 1 to 4 carbon atoms, such as methyl, ethyl, n- or isopropyl and t-butyl groups.

Preferred aromatic groups are phenyl or naphthyl groups. The alkyl groups and the aromatic groups can be substituted.

Preferred substituents are halogen atoms such as fluorine, amino groups, hydroxyl groups or short-chain alkyl groups such as methyl or ethyl groups.

Preference is given to polyazoles containing repeating units of the formula (I) in which the radicals X are the same within a repeating unit.

The polyazoles may in principle also contain different repeating units, differing for example in their radical X. Preferably, however, there are only the same radicals X in one repeating unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In another embodiment of the present invention the polymer comprising repeating azole units is a copolymer or a blend containing at least two units of the formula (I) to (XXII) which are different from one another. The polymers may be in the form of block copolymers (diblock, triblock), random copolymers, periodic copolymers and/or alternating polymers.

In a particularly preferred embodiment of the present invention the polymer comprising repeating azole units is a polyazole containing only units of the formula (I) and/or (II).

The number of repeating azole units in the polymer is preferably a whole number greater than or equal to 10. Particularly preferred polymers contain at least 100 repeating azole units.

In the context of the present invention preference is given to polymers comprising repeating benzimidazole units. Some examples of the very advantageous polymers comprising repeating benzimidazole units are shown by the formulae below:

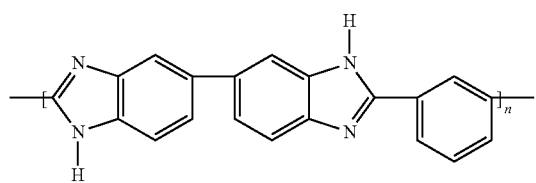 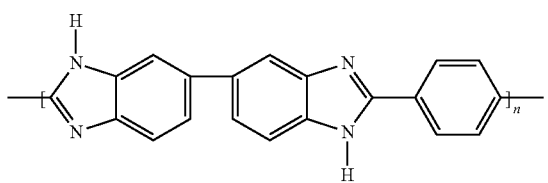
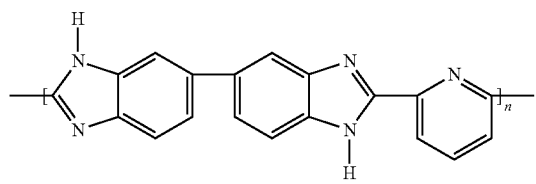 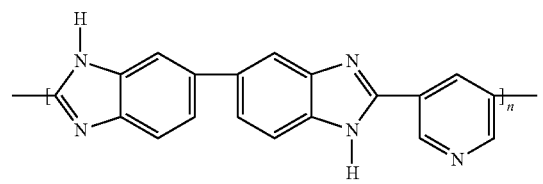
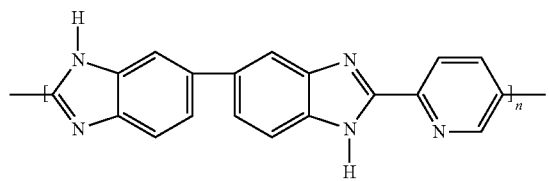 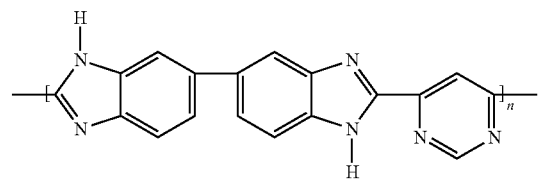
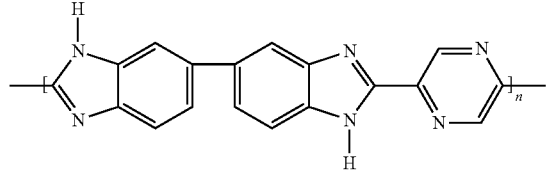 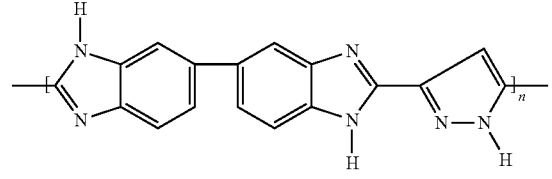
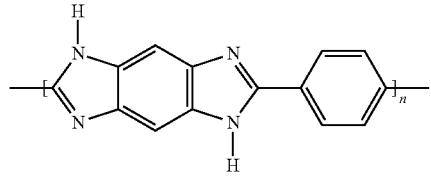 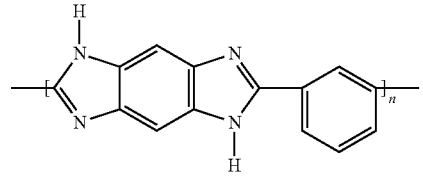
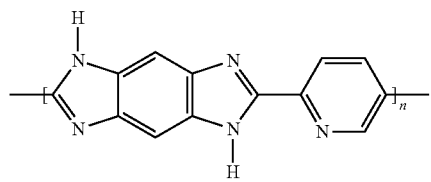 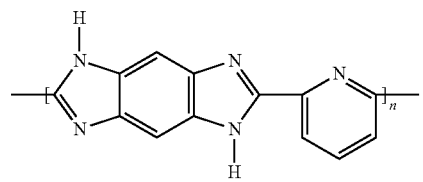
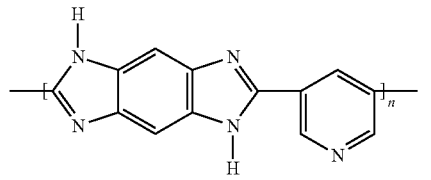 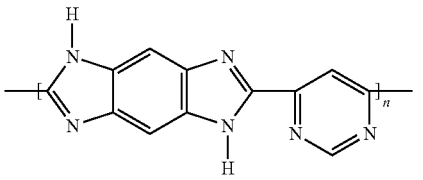
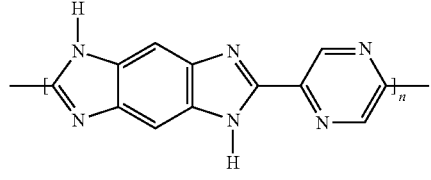 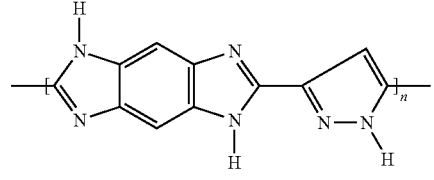
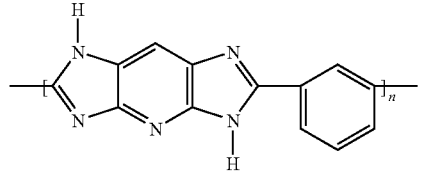 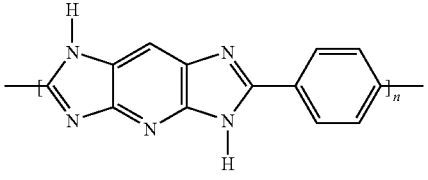

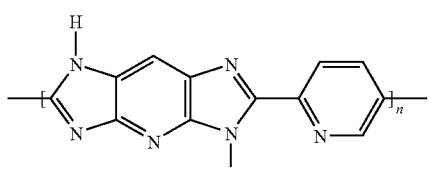 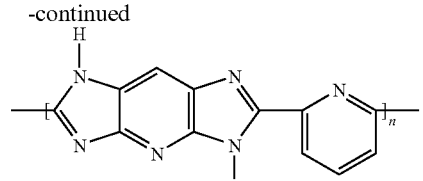

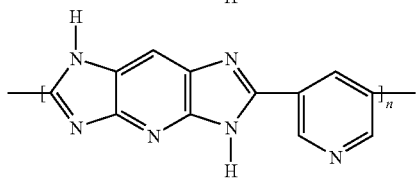 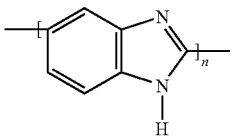

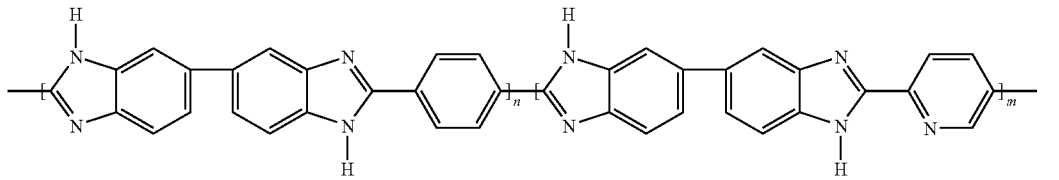

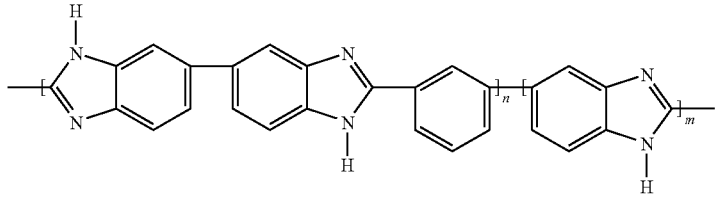

where n and m are each an integer greater than or equal to 10, preferably greater than or equal to 100.

The polyazoles used, but in particular the polybenzimidazoles, feature a high molecular weight. Measured as the intrinsic viscosity this is at least 0.2 dl/g, preferably from 0.8 to 10 dl/g, in particular from 1 to 10 dl/g.

The preparation of such polyazoles is known: one or more aromatic tetramino compounds are reacted with one or more aromatic carboxylic acids and/or esters thereof containing at least two acid groups per carboxylic acid monomer in the melt to form a prepolymer. The prepolymer formed solidifies in the reactor and is subsequently mechanically comminuted. The pulverulent prepolymer is customarily subjected to final polymerization in a solid-phase polymerization at temperatures of up to 400° C.

The preferred aromatic carboxylic acids include, among others, dicarboxylic acids and tricarboxylic acids and tetracarboxylic acids and/or their esters or their anhydrides or their acid chlorides. The term "aromatic carboxylic acids" embraces equally heteroaromatic carboxylic acids as well.

The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid; 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, and the C1-C20 alkyl esters or C5-C12 aryl esters thereof, or the acid anhydrides thereof or the acid chlorides thereof.

The aromatic tri- and tetracarboxylic acids and their C1-C20 alkyl esters or C5-C12 aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids and/or their C1-C20 alkyl esters or C5-C12 aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-diphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used are preferably heteroaromatic dicarboxylic acids and tricarboxylic acids and tetracarboxylic acids and their esters or their anhydrides. By heteroaromatic carboxylic acids are meant aromatic systems which contain at least one nitrogen, oxygen, sulfur or phosphorus atom in the aromatic moiety. The compounds in question are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20 alkyl esters or C5-C12 aryl esters, or their acid anhydrides or their acid chlorides.

The amount of tricarboxylic acid and/or tetracarboxylic acids (based on dicarboxylic acid used) is between 0 and 30 mol %, preferably 0.1 and 20 mol %, in particular 0.5 and 10 mol %.

The aromatic and heteroaromatic diaminocarboxylic acids used are preferably diaminobenzoic acid and the mono- and dihydrochloride derivatives thereof.

Preference will be given to using mixtures of at least 2 different aromatic carboxylic acids. With particular preference mixtures are used which in addition to aromatic carboxylic acids contain heteroaromatic carboxylic acids as well. The mixture ratio of aromatic carboxylic acids to heteroaromatic carboxylic acids is between 1:99 and 99:1, preferably from 1:50 to 50:1.

These mixtures are, in particular, mixtures of N-heteroaromatic dicarboxylic acids and aromatic dicarboxylic acids. Nonlimiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid and 2,5-pyrazinedicarboxylic acid.

The preferred aromatic tetramino compounds include, among others, 3,3',4,4'-tetraaminobiphenyl, 2,3,5,6-tetraminopyridine, 1,2,4,5-tetraminobenzene, 3,3',4,4'-tetraminodiphenyl sulfone, 3,3',4,4'-tetraminodiphenyl ether, 3,3',4,4'-tetraaminobenzophenone, 3,3',4,4'-tetraminodiphenylmethane and 3,3',4,4'-tetraminodiphenyldimethylmethane and also the salts thereof, in particular their mono-, di-, tri- and tetrahydrochloride derivatives.

Preferred polybenzimidazoles are available commercially under the trade name ®Celazole from Celanese AG.

Preferred polymers comprises polysulfones, particularly polysulfones comprising aromatic and/or heteroaromatic groups in the polymer backbone. According to a special aspect of the present invention preferred polysulfones and polyether sulfones have a melt volume rate MVR 300/21.6 measured in accordance with ISO 1133 which is smaller or equal to 40 cm$^3$/10 min, in particular smaller or equal to 30 cm$^3$/10 min and preferably smaller or equal to 20 cm$^3$/10 min. Preference is given to polysulfones having a vicat softening temperature (???) VST/A/50 in the range of 180° C. to 230° C. The number average molecular weight of the polysulfones is preferably greater than 30,000 g/mol.

Suitable polysulfones preferably comprise recurring unit of the general formulas A, B, C, D, E, F and/or G:

 (A)

 (B)

 (C)

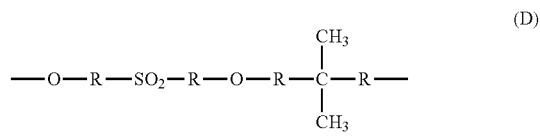 (D)

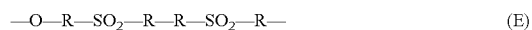 (E)

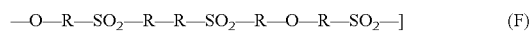 (F)

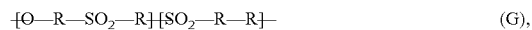 (G), wherein the radicals R which may be the same or different independently represent a aromatic or heteroaromatic group, wherein these groups have been specified above. Preferred groups comprise 1,2-phenylene, 1,3-phenylene, 1,4-phenylene, 4,4'-biphenyl, pyridine, chinoline naphthaline, phenanthrene.

Polysulfones preferred in accordance with the present invention comprise homopolymers and copolymers, e.g. statistic copolymers. Particularly preferred polysulfones comprise recurring units of the formulas H to N:

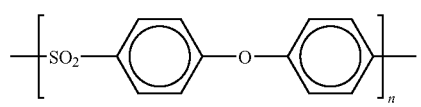 (H)

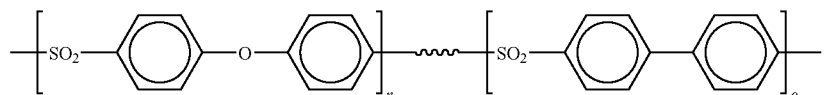 (I)

with n > o

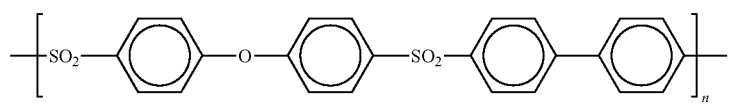 (J)

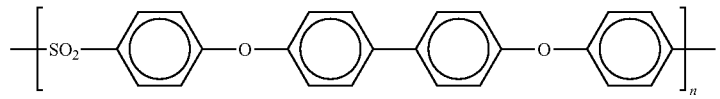 (K)

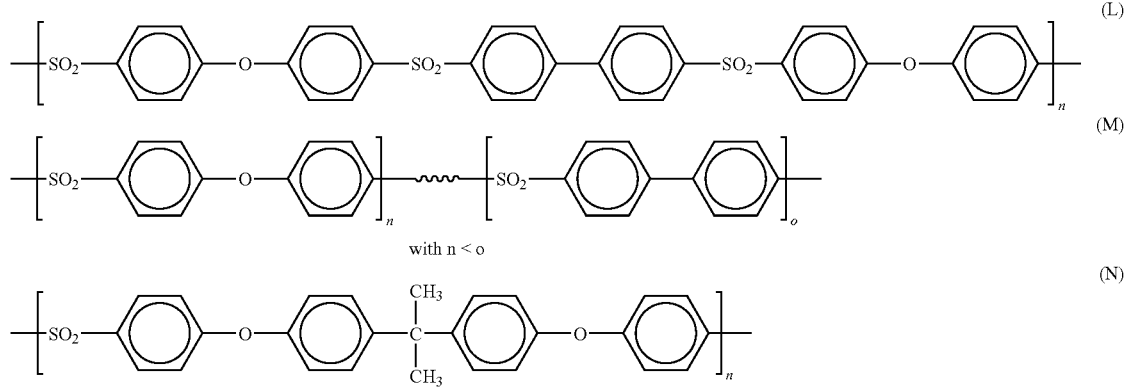

The polysulfones mentioned above are commercially obtainable under the trademarks ®Victrex 200 P, ®Victrex 720 P, ®Ultrason E, ®Ultrason S, ®Mindel, ®Radel A, ®Radel R, ®Victrex HTA, ®Astrel and ®Udel.

In addition polyetherketones, polyetherketoneketones, polyetheretherketones, polyetheretherketoneketones and polyarylketones are especially preferred. These high performance polymers are known per se and are commercially available under the trademarks ®Victrex PEEK™, ®Hostatec, ®Kadel.

For producing polymer films the polyazole is dissolved in a further step in polar aprotic solvents such as dimethylacetamide (DMAc), for example, and a film is produced by conventional methods.

Solvent residues can be removed by treating the resulting film with a wash liquid. For more details reference is made to the German patent application DE 101 098 29. The cleaning of the polyazole film in accordance with the German patent application surprisingly results in an improvement in the mechanical properties of the film. These properties include the elasticity modulus, the tensile strength and the fracture toughness of the film.

The polymer film may additionally feature further modifications, by crosslinking as in German patent application DE 101 107 52 or in WO 00/44816, for example. In one preferred embodiment the polymer film used, comprising a basic polymer and at least one blend component, further comprises a crosslinker as described in German patent application DE 101 401 47.

The thickness of the polyazole films may lie within wide ranges. Preferably the thickness of the polyazole film prior to doping with acid lies in the range from 5 μm to 2000 μm, more preferably from 10 μm to 1000 μm, without any intention that this should constitute a restriction.

In order to obtain proton conductivity these films are doped with an acid. Acids in this context include all known Lewis and Brønsted acids, preferably inorganic Lewis and Brønsted acids.

Also possible, furthermore, is the use of polyacids, especially isopolyacids and heteropolyacids, and mixtures of different acids. For the purposes of the present invention heteropolyacids are inorganic polyacids having at least two different central atoms, which are formed as partial mixed anhydrides from in each case weak polybasic oxo acids of a metal (preferably Cr, Mo, V, W) and of a nonmetal (preferably As, I, P, Se, Si, Te). They include, among others, 12-molybdatophosphoric acid and 12-tungstophosphoric acid.

The degree of doping can be used to influence the conductivity of the polyazole film. The conductivity increases with increasing concentration of dopant until a maximum value is reached. In accordance with the invention the degree of doping is indicated in moles of acid per mole repeating unit of the polymer. For the purposes of the present invention a degree of doping of between 3 and 80, preferably between 5 and 60, in particular between 12 and 60, is preferred.

Particularly preferred dopants are sulfuric acid and phosphoric acid and compounds releasing these acids, e.g. during hydrolysis. An especially preferred dopant is phosphoric acid ($H_3PO_4$). Highly concentrated acids are generally used here. According to one particular aspect of the present invention the concentration of the phosphoric acid is at least 50% by weight %, in particular at least 80% by weight, based on the weight of the dopant.

Doped polyazole films can also be obtained by a method comprising the steps of
I) dissolving the polyazole polymer in polyphosphoric acid,
II) heating the solution obtainable in accordance with step A) under inert gas to temperatures of up to 400° C.,
III) forming a membrane using the solution of the polyazole polymer according to step II) on a support, and
IV) treating the membrane formed in step III) until it is self-supporting.

Further details with respect proton conducting membranes of that kind can be found in DE 102 464 61. They are commercially available under the trademark Celtec®, for example.

Doped polyazole films can also be obtained by a method comprising the steps of
A) mixing one or more aromatic tetramino compounds with one or more aromatic carboxylic acids and/or esters thereof containing at least two acid groups per carboxylic acid monomer, or mixing one or more aromatic and/or heteroaromatic diaminocarboxylic acids in polyphosphoric acid to form a solution and/or dispersion,
B) applying a layer using the mixture according to step A) to a support or to an electrode,
C) heating the sheetlike structure/layer obtainable according to step B) under inert gas to temperatures of up to 350° C., preferably up to 280° C., to form the polyazole polymer,
D) treating the membrane formed in step C) (until it is self-supporting).

Further details with respect proton conducting membranes of that kind can be found in DE 102 464 59. They are commercially available under the trademark Celtec®, for example.

The aromatic and/or heteroaromatic carboxylic acid and tetramino compounds for use in step A) have been described above.

The polyphosphoric acid used in step A) comprises commercially customary polyphosphoric acids such as are obtainable for example from Riedel-de Haen. The polyphosphoric acids $H_{n+2}P_nO_{3n+1}$ (n>1) normally possess a purity, calculated as $P_2O_5$ (by acidimetry), of at least 83%. Instead of a solution of the monomers it is also possible to produce a dispersion/suspension.

The mixture produced in step A) has a weight ratio of polyphosphoric acid to the sum of all the monomers of from 1:10 000 to 10 000:1, preferably from 1:1000 to 1000:1, in particular from 1:100 to 100:1.

Layer formation in accordance with step B) takes place by means of measures known per se (casting, spraying, knife-coating) which are known from the prior art relating to polymer film production. Suitable supports are all supports which can be referred to as inert under the conditions. In order to adjust the viscosity it is possible if desired to add phosphoric acid (concentrated phosphoric acid, 85%) to the solution. By this means the viscosity can be adjusted to the desired figure and the formation of the membrane can be made easier.

The layer produced according to step B) has a thickness of between 20 and 4000 µm, preferably between 30 and 3500 µm, in particular between 50 and 3000 µm.

Where the mixture according to step A) also includes tricarboxylic acids and/or tetracarboxylic acids, this produces branching/crosslinking in the polymer formed. This contributes to improving the mechanical property.

Treatment of the polymer layer produced according to step C) in the presence of moisture at temperatures and for a duration sufficient for the layer to possess adequate strength for use in fuel cells. Treatment may be carried out to the point where the membrane is self-supporting, so that it can be detached without damage from the support.

According to step C) the sheetlike structure obtained in step B) is heated to a temperature of up to 350° C., preferably up to 280° C. and more preferably in the range from 200° C. to 250° C. The inert gases to be used in step C) are known in the art. They include, in particular, nitrogen, and also noble gases, such as neon, argon and helium.

In one version of the method the formation of oligomers and/or polymers may be brought about simply by heating the mixture from step A) to temperatures of up to 350° C., preferably up to 280° C. Depending on the chosen temperature and duration it is possible subsequently to do without some or all of the heating in step C). This version is also subject matter of the present invention.

The treatment of the membrane in step D) takes place at temperatures above 0° C. and less than 150° C., preferably at temperatures between 10° C. and 120° C., in particular between room temperature (20° C.) and 90° C., in the presence of moisture and/or water and/or water vapor and/or water-containing phosphoric acid of up to 85%. The treatment takes place preferably under atmospheric pressure, but may also take place under pressure exposure. What is important is that the treatment takes place in the presence of sufficient moisture, the polyphosphoric acid present undergoing partial hydrolysis to form low molecular mass polyphosphoric acid and/or phosphoric acid and thereby contributing to strengthening the membrane.

The partial hydrolysis of the polyphosphoric acid in step D) leads to a strengthening of the membrane and to a decrease in the layer thickness and the formation of a membrane having a thickness of between 15 and 3000 µm, preferably between 20 and 2000 µm; in particular between 20 and 1500 µm, which is self-supporting.

The intramolecular and intermolecular structures (interpenetrating networks; IPN) present in the polyphosphoric acid layer according to step B) lead in step C) to an ordered membrane formation, which proves responsible for the particular properties of the membrane formed.

The upper temperature limit of the treatment according to step D) is generally 150° C. In the case of extremely short moisture exposure—for example, exposure to superheated steam, this steam may also be hotter than 150° C. Key to the upper temperature limit is the duration of the treatment.

The partial hydrolysis (step D) may also take place in climatically controlled chambers in which the hydrolysis can be specifically controlled under defined moisture exposure. The humidity in this case may be set specifically by means of the temperature and/or saturation of the contacting environment, for example, gases such as air, nitrogen, carbon dioxide or other suitable gases, or steam. The duration of treatment is dependent on the parameters chosen above.

The treatment period is also dependent on the thickness of the membrane.

Generally speaking, the period of treatment is between a few seconds to minutes, on exposure to superheated steam for example, or up to whole days, in air at room temperature with low relative atmospheric humidity, for example. The period of treatment is preferably between 10 seconds and 300 hours, in particular from 1 minute to 200 hours.

If the partial hydrolysis is carried out at room temperature (20° C.) with ambient air having a relative atmospheric humidity of 40-80%, the treatment period is between 1 and 200 hours.

The membrane obtained in accordance with step D) can be designed so as to be self-supporting; that is, it can be detached from the support without damage and subsequently processed further directly if desired.

By way of the degree of hydrolysis, i.e., the duration, temperature and ambient humidity, it is possible to adjust the concentration of phosphoric acid and hence the conductivity of the polymer membrane. The concentration of the phosphoric acid is specified as moles of acid per mole of repeating unit of the polymer. By means of the method comprising steps A) to D) it is possible to obtain membranes having a particularly high phosphoric acid concentration. Preference is given to a concentration (moles of phosphoric acid per repeating unit of the formula (I), polybenzimidazole, for example) of between 10 and 50, in particular between 12 and 40. Degrees of doping of this level (concentrations) are very difficult if not impossible to obtain by doping polyazoles with commercially available ortho-phosphoric acid.

In accordance with a modification of the method described, in which doped polyazole films are produced, by using polyphosphoric acid, these films can also be produced by a method comprising the steps of 1) reacting one or more aromatic tetramino compounds with one or more aromatic carboxylic acids and/or esters thereof containing at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained according to step 1) in polyphosphoric acid,
3) heating the solution obtainable according to step 2) under inert gas to temperatures of up to 300° C., preferably up to 280° C., to form the dissolved polyazole polymer, 4) forming a membrane using the solution of the polyazole polymer according to step 3) on a support, and
5) treating the membrane formed in step 4) until it is self-supporting.

The method steps set out under sections 1) to 5) have been elucidated in more detail above for steps A) to D), to which reference is made, particularly in respect of preferred embodiments.

Further details with respect proton conducting membranes of that kind can be found in DE 102 464 59. They are commercially available under the trademark Celtec®, for example.

In another preferred embodiment of the present invention membranes are used comprising polymers which are derived from monomers containing phosphonic acid groups and/or monomers containing sulphuric acid groups and which are commercially available under the trademark Celtec®, for example.

Proton-conducting polymer membranes of that kind may be obtained by a method comprising the steps of
A) preparation of a mixture comprising at least one polymer and monomers comprising phosphonic acid groups
B) deposition of a layer on a carrier by using the mixture of step A)
C) polymerization of the monomers comprising phosphonic acid groups in the two-dimensional material obtainable according to step B).

This method is described in DE 102 135 40 for example.

In addition proton-conducting polymer membranes of that kind may be obtained by a method comprising the steps of
A) swelling of a polymer film with a liquid containing monomers comprising phosphonic acid groups and
B) polymerization of at least a part of the monomers containing phosphonic acid groups introduced in the polymer film in step 1).

This method is described in DE 102 094 19 for example.

Swelling is meant to be a weight increase of the film of at least 3%-wt. Preferably the swelling is at least 5%, in particular at least 10%.

The swelling is measured by gravimetry and calculated from the mass of the polymer film before the swelling $m_0$ and the mass of the polymer film after the polymerization according to step B) $m_2$ $$Q=(m_2-m_0)m_0\times 100$$

Preferably the swelling is performed at a temperature above 0° C., in particular between roomtemperature (20° C.) and 180° C. and in a liquid that preferably contains at least 5%-wt. Monomers comprising phosphonic acid groups. In addition the swelling may also be performed under increased pressure, wherein the limits results from economic considerations and technical possibilities.

In general the polymer film used for the swelling has a thickness in the range of 5 to 3000 µm, preferably in the range of 10 to 1500 µm. The preparation of polymer films of that kind is generally known. In part they are also commercially available. The term polymer film means that the film used for the swelling comprises polymers comprising sulfonic acid groups, wherein the film may comprises further additives.

The preparation of the film and of the preferred polymers, in particular polyazoles and/or polysulfones has been described above.

The liquid comprising monomers comprising phosphonic acid groups and/or monomers comprising sulfuric acid groups may be a solution wherein the liquid may also comprise suspended or dispersed components. The viscosity of the liquid comprising monomers comprising phosphonic acid groups may be in a wide range. The viscosity may be adapted by adding solvents or by increasing the temperature. Preferably the dynamic viscosity is in the range of 0.1 to 10000 mPa*s, in particular in the range of 0.2 to 2000 mPa*s wherein these values may be measured in accordance with DIN 53015 for example.

Vinyl-containing phosphonic acids are known in the art. These are compounds which contain at least one carbon-carbon double bond and at least one phosphonic acid group. The two carbon atoms forming the carbon-carbon double bond have at least two, preferably 3, bonds to groups which lead to low stearic hindrance of the double bond. These groups include hydrogen atoms and halogen atoms, particularly fluorine atoms. In the context of the present invention the polyvinylphosphonic acid is the polymerization product obtained by polymerizing the vinyl-containing phosphonic acid alone or with further monomers and/or crosslinkers.

The vinyl-containing phosphonic acid may contain one, two, three or more carbon-carbon double bonds. The vinyl-containing phosphonic acid may further contain two, three or more phosphonic acid groups.

Generally speaking, the vinyl-containing phosphonic acid contains 2 to 20, preferably 2 to 10, carbon atoms.

The vinyl-containing phosphonic acid used in step A) preferably comprises compounds of the formula

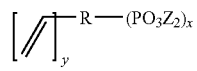

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10,
y is an integer 1, 2, 3, 4, 5, 6, 7, 8, 9 or 10
and/or of the formula

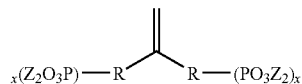

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, NZ$_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer of 1, 2, 3, 4, 5, 6, 7, 8, 9 or 10, and/or of the formula

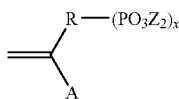

in which
A is a group of the formulae $COOR^2$, CN, $CONR^2_2$, $OR^2$ and/or $R^2$, in which
$R^2$ is hydrogen, a C1-C15 alkyl group, C1-C15-alkoxy group, ethyleneoxy group or C5-C20 aryl or heteroaryl group, it being possible for the above radicals to be substituted in turn by halogen, —OH, COOZ, —CN, $NZ_2$,
R is a bond, a divalent C1-C15 alkylene group, divalent C1-C15 alkyleneoxy group, such as ethyleneoxy group or divalent C5-C20 aryl or heteroaryl group, it being possible for the above radicals to be substituted in turn by halogen, —OH, COOZ, —CN, $NZ_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10.

The preferred vinyl-containing phosphonic acids include alkenes which contain phosphonic acid groups, such as ethenephosphonic acid, propenephosphonic acid, butenephosphonic acid; acrylic acid and/or methacrylic acid compounds containing phosphonic acid groups, such as 2-phosphonomethylacrylic acid, 2-phosphonomethylmethacrylic acid, 2-phosphonomethylacrylamide and 2-phosphonomethylmethacrylamide, for example.

Particular preference is given to using commercial vinylphosphonic acid (ethenephosphonic acid) such as is obtainable for example from Aldrich or Clariant GmbH. A preferred vinylphosphonic acid has a purity of more than 70%, in particular 90% and more preferably more than 97% purity.

The vinyl-containing phosphonic acids can additionally be used in the form of derivatives which can be converted subsequently into the acid, it being possible for the conversion to the acid to take place in the polymerized state as well. Such derivatives include in particular the salts, the esters, the amides and the halides of the vinyl-containing phosphonic acids.

The liquid used preferably comprises at least 20%-wt., in particular at least 30%-wt. and very preferably at least 50%-wt. of monomers comprising phosphonic acid groups and/or monomers comprising sulfuric acid groups based on the total weight of the mixture.

The liquid used may additionally comprise further organic and/or inorganic solvents. Suitable organic solvents comprise polar aprotic solvents, such as dimethyl sulfoxide (DMSO), ester, such as ethylacetate, and polar protic solvents, such as alcohols, such as ethanol, propanol, isopropanol and/or butanol. Inorganic solvents include water, phosphoric acid and polyphosphoric acid.

These may positively influence the workability. In particular the absorbing capacity with respect to the monomers may be increased by the addition of organic solvents. In these solutions the content of the monomers comprising phosphoric acid groups and/or monomers comprising sulfuric acid groups is generally at least 5%-wt., preferably at least 10%-wt. and very preferably between 10 and 97%-wt.

Vinyl-containing sulfonic acids are known in the art. These are compounds which contain at least one carbon-carbon double bond and at least one sulfonic acid group. The two carbon atoms forming the carbon-carbon double bond have at least two, preferably 3, bonds to groups which lead to low stearic hindrance of the double bond. These groups include hydrogen atoms and halogen atoms, particularly fluorine atoms. In the context of the present invention the polyvinylsulfonic acid is the polymerization product obtained by polymerizing the vinyl-containing sulfonic acid alone or with further monomers and/or crosslinkers.

The vinyl-containing sulfonic acid may contain one, two, three or more carbon-carbon double bonds. The vinyl-containing sulfonic acid may further contain two, three or more sulfonic acid groups.

Generally speaking, the vinyl-containing sulfonic acid contains 2 to 20, preferably 2 to 10, carbon atoms.

The vinyl-containing sulfonic acid used in step A) preferably comprises compounds of the formula

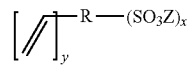

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —ON, $NZ_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10,
y is an integer 1, 2, 3, 4, 5, 6, 7, 8, 9 or 10
and/or of the formula

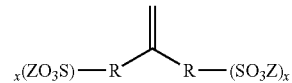

in which
R is a bond, a C1-C15 alkyl group, C1-C15 alkoxy group, ethyleneoxy group or C5-C20 aryl or heteroaryl group, it being possible for the above radicals to be substituted in turn by halogen, —OH, COOZ, —CN, $NZ_2$,
Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and
x is an integer 1, 2, 3, 4, 5, 6, 7, 8, 9 or 10,
and/or of the formula

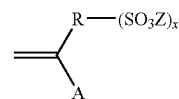

in which
A is a group of the formulae $COOR^2$, CN, $CONR^2_2$, $OR^2$ and/or $R^2$, in which R² is hydrogen, a C1-C15 alkyl group, C1-C15-alkoxy group, ethyleneoxy group or C5-C20 aryl or heteroaryl group, it being possible for the above radicals to be substituted in turn by halogen, —OH, COOZ, —CN, NZ₂, R is a bond, a divalent C1-C15 alkylene group, divalent C1-C15 alkyleneoxy group, such as ethyleneoxy group or divalent C5-C20 aryl or heteroaryl group, it being possible for the above radicals to be substituted in turn by halogen, —OH, COOZ, —CN, NZ₂, Z independently at each occurrence is hydrogen, C1-C15 alkyl group, C1-C15 alkoxy group, ethyleneoxy group or C5-C20 aryl or heteroaryl group, it being possible for the above radicals to be substituted in turn by halogen, —OH, —CN, and x is an integer 1, 2, 3, 4, 5, 6, 7, 8, 9 or 10.

The preferred vinyl-containing sulfonic acids include alkenes which contain sulfonic acid groups, such as ethenesulfonic acid, propenesulfonic acid, butenesulfonic acid; acrylic acid and/or methacrylic acid compounds containing sulfonic acid groups, such as 2-sulfomethylacrylic acid, 2-sulfomethylmethacrylic acid, 2-sulfomethylacrylamide and 2-sulfomethylmethacrylamide, for example.

Particular preference is given to using commercial vinylsulfonic acid (ethenesulfonic acid) such as is obtainable for example from Aldrich or Clariant GmbH. A preferred vinylsulfonic acid has a purity of more than 70%, in particular 90% and more preferably more than 97% purity.

The vinyl-containing sulfonic acids can additionally be used in the form of derivatives which can be converted subsequently into the acid, it being possible for the conversion to the acid to take place in the polymerized state as well. Such derivatives include in particular the salts, the esters, the amides and the halides of the vinyl-containing sulfonic acids.

In accordance with a specific aspect of the present invention the weight ratio of the monomers comprising sulfuric acid groups to the monomers comprising phosphoric acid groups may be in the range of 100:1 to 1:100, preferably in the range of 10:1 to 1:10 and very preferably in the range of 2:1 and 1:2. In accordance with a further specific aspect of the present invention the monomers comprising phosphoric acid groups are preferred over the monomers comprising sulfuric acid groups. Therefore it is especially preferred to use a liquid comprising monomers comprising phosphoric acid groups.

In a further embodiment of the invention it is possible to use monomers capable of crosslinking. These monomers can be added to the liquid used for the treatment of the film. Additionally the monomers capable of crosslinking may also be applied to the sheetlike structure after the treatment with the liquid.

The monomers capable of crosslinking are, in particular, compounds containing at least 2 carbon-carbon double bonds. Preference is given to dienes, trienes, tetraenes, dimethylacrylates, trimethylacrylates, tetramethylacrylates, diacrylates, triacrylates and tetraacrylates.

Particular preference is given to dienes, trienes and tetraenes of the formula

dimethylacrylates, trimethylacrylates, and tetramethylacrylates of the formula

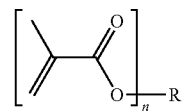

diacrylates, triacrylates and tetraacrylates of the formula

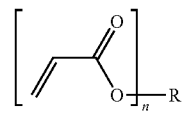

in which

R is a C1-C15 alkyl group, C5-C20 aryl or heteroaryl group, NR', —SO₂, PR', Si(R')₂, it being possible for the above radicals in turn to be substituted, R' independently at each occurrence is hydrogen, a C1-C15 alkyl group, C1-C15 alkoxy group, C5-C20 aryl or heteroaryl group and n is at least 2.

The substituents of the above radical R are preferably halogen, hydroxyl, carboxy, carboxyl, carboxyl ester, nitriles, amines, silyl, siloxane radicals.

Particularly preferred crosslinkers are allyl methacrylate, ethylene glycol dimethacrylate, diethylene glycol dimethacrylate, triethylene glycol dimethacrylate, tetraethylene and polyethylene glycol dimethacrylate, 1,3-butanediol dimethacrylate, glycerol dimethacrylate, diurethane dimethacrylate, trimethylpropane trimethacrylate, epoxy acrylates, Ebacryl for example, N',N-methylenebisacrylamide, carbinol, butadiene, isoprene, chloroprene, divinylbenzene and/or bisphenol A dimethylacrylate. These compounds are available commercially, for example, from Sartomer Company Exton, Pa. under the names CN-120, CN104 and CN-980.

The use of crosslinkers is optional; these compounds can be used usually in the range between 0.05 to 30% by weight, preferably 0.1 to 20% by weight, more preferably 1 and 10% by weight, based on the weight of vinyl-containing sulfonic acid and, where used, vinyl-containing phosphonic acid.

The liquid comprising monomers comprising phosphonic acid groups and/or monomers comprising sulfuric acid groups may be a solution wherein the liquid may also comprise suspended or dispersed components. The viscosity of the liquid comprising monomers comprising phosphonic acid groups may be in a wide range. The viscosity may be adapted by adding solvents or by increasing the temperature. Preferably the dynamic viscosity is in the range of 0.1 to 10000 mPa*s, in particular in the range of 0.2 to 2000 mPa*s wherein these values may be measured in accordance with DIN 53015 for example.

A membrane, especially a membrane based on polyazoles, can also be surface-crosslinked by exposure to heat in the presence of atmospheric oxygen. This curing of the membrane surface additionally improves the properties of the membrane. For this purpose the membrane can be heated to a temperature of at least 150° C., preferably at least 200° C. and more preferably at least 250° C. The oxygen concentration for this method step is usually in the range from 5 to 50% by volume, preferably from 10 to 40% by volume, without any intention that this should constitute a restriction.

Crosslinking may also take place by exposure to IR or NIR (IR=infrared, i.e., light having a wavelength of more than 700 nm; NIR=near IR, i.e., light having a wavelength in the range from about 700 to 2000 nm or an energy in the range from about 0.6 to 1.75 eV). Another method is to irradiate with 13 radiation. The radiation dose in this case is between 5 and 200 kGy.

The duration of the crosslinking reaction may lie within a wide range depending on the desired degree of crosslinking. Generally speaking, this reaction time is in the range from 1 second to 10 hours, preferably from 1 minute to 1 hour, without any intention that this should constitute a restriction.

According to the present invention the membrane electrode assembly comprises at least two electrochemically active electrodes (anode and cathode) separated by the polymer electrolyte membrane. The term "electrochemically active" indicates that the electrodes are capable of catalyzing the oxidation of $H_2$ and/or at least one reformate and the reduction of $O_2$. This property may be obtained by coating the electrodes with platinum and/or ruthenium. The term "electrode" means that the material has an electron conductivity, it being possible for the electrode optionally to have a layer of precious metal, without being restricted to this. Electrodes of this kind are known and are described for example in U.S. Pat. Nos. 4,191,618, 4,212,714 and 4,333,805.

The electrodes preferably comprise one or more gas diffusion layers that are in contact with a catalysator layer.

Normally sheetlike structures which are electrically conducting and acid resistant are used as gas diffusion layers. Such structures include, for example, carbon fiber papers, graphitized carbon fiber papers, carbon fiber fabrics, graphitized carbon fiber fabrics and/or sheetlike structures which have been made conductive by adding carbon black. By the use of these layers a fine distribution of the gas and/or liquid flows is achieved.

In addition the gas diffusion layers may also be used which comprise a mechanically stable supporting material impregnated with at least one electric conducting material, e.g. with carbon (carbon black, for example). Particularly suitable supporting materials include, but are not restricted to, fibers, such as fiber fleeces, paper or fabrics, in particular carbon fibers, glass fibers or fibers comprising organic polymers, such as polypropylene, polyester (polyethyleneterephthalate), polyphenylene sulfide or polyetherketones. For further details reference is made to WO 9720358, for example.

The gas diffusion layers have preferably a thickness in the range of 80 µm to 2000 µm, more preferably in the range of 100 µm to 1000 µm and in particular in the range of 150 µm to 500 µm.

Furthermore the gas diffusion layers preferably have a high porosity, which is preferably in the range of 20% to 80%.

The gas diffusion layers may contain typical additives. Suitable additives include, but are not restricted to, fluoropolymers, such as polytetrafluoroethylene (PTFE), and surface-active substances.

According to one especially preferred embodiment at least one gas diffusion layer consists of a compressible material. A compressible material is characterized by the property whereby the gas diffusion layer may be compressed by pressure to half, in particular one third, of its original thickness, without losing of its integrity.

Generally gas diffusion layers made of graphite woven or paper, which has been made conductive by adding carbon black, possess these properties.

The catalytically active coat comprises a catalytically active substance. Such substances include noble metals, especially platinum, palladium, rhodium, iridium and/or ruthenium. These substances can also be used in the form of alloys with one another. Furthermore, these substances can be used as alloys with non-noble metals, such as Cr, Zr, Ni, Co and/or Ti, for example. It is additionally possible to employ the oxides of the aforementioned noble metals and/or non-noble metals. The above-mentioned noble metals and/or non noble metals are typically used on a carrier, mostly carbon having a high specific surface, in the form of nano particles.

According to one particular aspect of the present invention the catalytically active compounds are used in the form of particles with a size of preferably in the range from 1 to 1000 nm, in particular from 10 to 200 nm and preferably from 20 to 100 nm.

According to one particular embodiment of the present invention the weight ratio of fluoropolymer to catalyst material comprising at least one noble metal and, if desired, one or more support materials is greater than 0.1, this ratio being preferably in the range from 0.2 to 0.6.

According to one particular embodiment of the present invention the catalyst coat has a thickness in the range from 1 to 1000 µm, in particular from 5 to 500, preferably from 10 to 300 µm. This figure represents an average figure, which can be determined by measuring the coat thickness in the cross-section of micrographs obtainable using a scanning electron microscope (SEM).

According to one particular embodiment of the present invention the noble metal content of the catalyst coat is from 0.1 to 10.0 mg/cm$^2$, preferably from 0.2 to 6.0 mg/cm$^2$ and very preferably from 0.3 to 3.0 mg/cm$^2$. These figures can be determined by elemental analysis on a sheetlike sample.

In general the catalytic layer is not self-supporting and is typically coated on the gas diffusion layer and/or the membrane. A part of the catalytic layer may penetrate into the gas diffusion layer and/or the membrane, for example, thereby forming interpenetrated layers. As a consequence the catalytic layer may occasionally be seen as a part of the gas diffusion layer.

According to the present invention the surfaces of the polymer electrolyte membrane are in contact with the electrodes in a way that the first electrode partially or totally covers the front of the polymer electrolyte membrane and that the second electrode partially or totally covers the back of the polymer electrolyte membrane. In that context the front of the polymer electrolyte membrane is the surface turned towards the viewer and the back of the polymer electrolyte membrane is the surface turned away from the viewer and the view direction is starting form the first electrode, preferably the cathode, towards the second electrode, preferably the anode.

Preferably the polymer electrolyte membrane comprises an outer area and an inner area wherein the front and the back of the inner area are merely in contact with the electrodes. According to this embodiment the first electrode at least partially covers the front of the inner area of the polymer electrolyte membrane and the second electrode at least partially covers the back of the inner area of the polymer electrolyte membrane, if the polymer electrolyte membrane is looked at perpendicular to its surface. By the way of contrast the outer area is not covered by the electrodes, if the polymer electrolyte membrane is looked at perpendicular to its surface.

The membrane electrode assembly of the invention also comprises two gasket layers made of a first gasket material wherein the first gasket layer partially covers the front of the polymer electrolyte membrane and/or the first electrode and the second gasket layer partially covers the back of the polymer electrolyte membrane and/or the second electrode. Preferably, the gasket layers cover at least 80% of the electrode-free area of the membrane.

According to one preferred embodiment of the present invention the surfaces of the polymer electrolyte membrane are completely covered by the two electrodes and the gasket layers.

The gasket layers are made of a first gasket material, preferably of poly(tetrafluoroethylene-co-hexafluoropropylene) FEP, polyvinylidene fluoride PVDF, perfluoro alkoxypolymer PFA, poly(tetrafluoroethylene-co-perfluoromethylenevinylether) MFA, dipolymers of vinylidenefluoride (VF2)/Hexafluoropropylene (HFP), terpolymers of vinylidenefluoride (VF2)/hexafluoropropylene (HFP)/tetrafluoroethylene (TFE), copolymers of tetrafluoroethylene (TFE)/propylene (PP) and of ethylene (E)/tetrafluoroethylene (TFE)/perfluoromethylvinylether (PMVE), polyketones, polyetherketones, polyetherketones (PEK), polyetheretherketones (PEEK), polyetheretherketoneketones (PEEKK), polyethersulfones (PES), polysulfones (PSU), polyphenylenesulfones (PPSU), polyphenylenesulfides (PPS), polyphenyloxydes (PPO), liquid-crystalline polymers (LCP), polyimides (PI), polyetherimides (PEI), polyamideimides (PAI) and/or polyphenylquinoxalines. These polymers are in many cases commercially available, e.g. under the trademarks Hostafon®, Hyflon®, Teflon®, Dyneon®, Nowoflon®, Viton°, Kadel®, LITE° K, Arlon®, Gatone®, Vitrex®, Imidex®, Vespel®, Fortron®, Ryton®, Tecetron®, Xydar®, Gafone®, Tecason® and Ketron®.

The first gasket material preferably exhibit a long-term service temperature of at least 190° C., preferably at least 220° C. and more preferably at least 250° C. as measured in accordance with MIL-P-46112B, paragraph 4.4.5.

According to a very preferred embodiment of the present invention the gasket layers comprise at least one polyimide, and are preferably made of at least one polyimide. Polyimides are known in the art. These polymers contain imide groups as key structural units of the main chain and are described for example in Ullmann's Encyclopedia of Industrial Chemistry 5$^{th}$ Ed. on CD-ROM, 1998, Keyword Polyimides.

The polyimides also include polymers which in addition to imide groups also contain amide groups (polyamide imides), ester groups (polyester imides) and ether groups (polyether imides) as components of the main chain.

Preferred polyimides contain repeating units of the formula (VI)

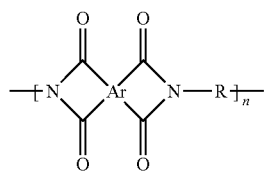

(XXIII)
in which the radical Ar is as defined above and the radical R is an alkyl group or a divalent aromatic or heteroaromatic group having 1 to 40 carbon atoms. Preferably the radical R is a divalent aromatic or heteroaromatic group deriving from benzene, naphthalene, biphenyl, diphenyl ether, diphenyl ketone, diphenyl methane, diphenyldimethylmethane, bisphenone, diphenyl sulfone, quinoline, pyridine, bipyridine, anthracene, thiadiazole and phenanthrene, which if desired may also be substituted. The index n indicates that the repeating units constitute part of the polymers.

Polyimides of this kind are available commercially under the trade names ®Kapton, ®Vespel, ®Toray and ®Pyralin from DuPont and also ®Ultem from GE Plastics and ®Upilex from Ube Industries.

The thickness of the gasket layer is preferably in the range from 5 μm to 1000 μm, in particular from 10 μm to 500 μm and more preferably from 25 μm to 100 μm.

The gasket layers present on the polymer electrolyte membrane preferably form a frame on at least one, preferably both, sides.

According to one particular aspect of the present invention the gasket layers are provided with fluoropolymers. By this means it is possible surprisingly to improve the long-term stability of the membrane electrode assemblies.

Suitable fluoropolymers are known in the art. They include, among others, polyfluorotetraethylene (PTFE) and poly(tetrafluoroethylene-co-hexafluoropropylene) (FEP). The layer of fluoropolymer on the polyimide layer generally has a thickness of at least 0.5 μm, in particular at least 2.5 μm. This layer can be provided between the polymer electrolyte membrane and the polyimide layer. It is also possible for the layer to be applied on the side facing away from the polymer electrolyte membrane. An additional possibility is for both surfaces of the polyimide layer to be provided with a layer of fluoropolymer.

Polyimide films provided with fluoropolymers that can be used in accordance with the invention are available commercially under the trade name ®Kapton FN from DuPont.

The two gasket layers preferably extend beyond the polymer electrolyte membrane and preferably are in flat contact with one another. The areas of the gasket layers that are in contact with one another are preferably welded in this case. Connection of this kind can be made easier in particular by means of at least one layer of fluoropolymer.

Surprisingly it is possible for the long-term stability of the membrane electrode assembly to be improved by virtue of there being at least one of the gasket layers in contact with at least one of the electrodes. According to one preferred embodiment both gasket layers are in contact with one electrode each. In this case the gasket layer can be arranged between the membrane and the electrode. It is also possible for the gasket layer to be in contact with the surface which is facing away from the membrane.

The contact area between gasket layer and electrode is preferably at least 0.2 mm$^2$, in particular at least 5 mm$^2$, without any intention that this should constitute a restriction. The upper limit of the contact area between electrode and gasket layer is imposed by economic considerations. The contact area is preferably less than or equal to 100%, in particular less than or equal to 80% and more preferably less than or equal to 60%, based on the electrochemically active area.

The gasket layer can be in contact with the electrode via the side faces. The side faces are the areas formed by the thickness of the electrode and of the gasket layer, respectively, and by the respective length and width of these layers.

The gasket layer is preferably in contact with the electrode by way of the surface, which is defined by way of the length and the width of the gasket layer and of the electrode, respectively.

This contact area of the electrode can be provided with fluoropolymer in order to improve the adhesion between gasket layer and electrode.

For further details regarding membrane electrode assemblies reference is made to the technical literature, in particular to the patent applications WO 01/18894 A2, DE 195 09 748, DE 195 09 749, WO 00/26982, WO 92/15121 and DE 197 57 492. The disclosure of these documents regarding the design and the preparation of membrane electrode assemblies and the electrodes, gas diffusion layers and catalysts to be chosen is also part of the present description.

According to the present invention the membrane electrode assembly comprises second gasket materials on the front of the first gasket layer and on the back of the second gasket layer. Suitable second gasket materials are known to the person skilled in the art and in particular comprise materials having a permanent use temperature, measured in accordance with MIL-P-46112 B, paragraph 4.4.5, of at least 190° C., preferably of at least 220° C. and in particular of at 250° C.

Very preferred second gasket materials comprise materials which can be applied by thermoplastic processes, in particular by injection moulding. Therefore fusible polymers are preferably used as the second gasket material. The particular preferred fusible polymers comprise fluoropolymers, in particular poly(tetrafluoroethylene-co-hexafluoropropylene) FEP, polyvinylidene fluoride PVDF, perfluoro alkoxypolymer PFA, poly(tetrafluoroethylene-co-perfluoromethylenevinylether) MFA, dipolymers of vinylidenefluoride (VF2)/hexafluoropropylene (HFP), terpolymers of vinylidenefluoride (VF2)/hexafluoropropylene (HFP)/tetrafluoroethylene (TFE), copolymers of tetrafluoroethylene (TFE)/propylene (PP) and of ethylene (E)/tetrafluoroethylene (TFE)/perfluoromethylvinylether (PMVE), polyketones, polyetherketones, polyetherketones (PEK), polyetheretherketones (PEEK), polyetheretherketoneketones (PEEKK), polyethersulfones (PES), polysulfones (PSU), polyphenylenesulfones (PPSU), polyphenylenesulfides (PPS), polyphenyloxides (PPO), liquid-crystalline polymers (LCP), polyimides (PI), polyetherimides (PEI), polyamideimides (PAI), polyphenylenquinoxalines. These polymers in many cases commercially available, e.g. under the trademarks Hostafon®, Hyflon®, Teflon®, Dyneon®, Nowoflon®, Viton®, Kadel®, LITE° K, Arlon®, Gatone®, Vitrex®, Imidex®, Vespel®, Fortron®, Ryton®, Tecetron®, Xydar®, Gafone®, Tecason® and Ketron®.

According to the present invention fluoropolymers are exceptionally preferred as the second gasket material.

According to the present invention the first gasket layer and the second gasket layer comprise one or more recesses, wherein at least one, preferably all, recesses in the first gasket layer are in contact with at least one, preferably all, recesses in the second gasket layer.

In addition the second gasket material on the front of the first gasket layer is in contact with the second gasket material on the back of the second gasket layer, preferably through at least one, preferably all, recesses in the first gasket layer and at least one, preferably all, recesses in the second gasket layer.

The first gasket layer and the second gasket layer preferably comprise one or more recesses partially or totally filled with the second gasket material, wherein the second gasket material in the first gasket layer and in the second gasket layers joins the second gasket material on the front of the first gasket layer to the second gasket material on the back of the second gasket layer, preferably in one piece. In that context the term "one piece" means that the entire second gasket materials are joined to one another and therefore represents one single gasket which can merely be removed completely by destroying the first and second gasket layers.

In principal, the shape, the size and the number of the recesses can be chosen arbitrarily. For example, the shape of the recesses may be half-round, round, oval, rectangular, square, angular, star-like etc. Furthermore the first and the second gasket layer may comprise many comparatively small recesses or a few comparatively big recesses. However it has proven particularly advantageous that the at least one recess in the first gasket layer and the at least one recess in the second gasket layer are channels which preferably run perpendicular to the surface of the gasket layer, i.e. in the view direction if the view direction is starting from the first electrode (front), preferably the cathode, towards the second electrode (back), preferably the anode.

In addition the at least one recess in the first gasket layer and the at least one recess in the second gasket layer are preferably holes, wherein the front end of the hole in the first gasket layer and the back end of the hole in the second gasket layer are preferably totally covered by the second gasket materials and wherein the back end of the hole in the first gasket layer is contact with the front end of the hole in the second gasket layer. The shape of the holes may be chosen arbitrarily. For example it may be round, oval, angular or star-like.

The sealing efficiency may be further improved by providing recesses at regular distances in the gasket layers so that the second gasket materials are sealingly laying on the front of the first gasket layer and on the back of the second gasket layer. Thereby a good adhesion of the second gasket materials on the surface of the first and the second gasket layer is not necessarily required.

The second gasket materials shall seal the membrane electrode assembly during its operation to best possibly avoid a leakage of reaction fluids and/or solvents out of the fuel cell. Therefore the second gasket material on the front of the first gasket layer and/or the second gasket material on the back of the second gasket layer, preferably the second gasket material on the front of the first gasket layer and the second gasket material on the back of the second gasket layer, is in contact with electric conducting separator plates which are typically provided with flowfield channels on the sides facing the electrodes in order to allow the distribution of the reactand fluids. The separator plates are typically made of graphite, or of a conductive heat-resistant plastic.

In general the second gasket materials and the separator plates seal the gas space and the membrane electrode assembly from the environment. In addition the second gasket materials generally seal the gas spaces of the anode and of the cathode from one another. Accordingly it has been surprisingly found that an improved sealing concept may lead to a fuel cell with a prolonged lifetime.

Therefore the second gasket materials are preferably provided in a form that at least one, preferably two separator plates may be sealingly laid on the front of the first gasket layer and/or on the back of the second gasket layer, preferably on the front of the first gasket layer and on the back of the second gasket layer. Thereby the sealing effect may be improved by laminating the combination of the separator plate(s) and the membrane electrode assembly according to the present invention.

To further improve the sealing effect the contact area of the second gasket material on the front of the first gasket layer and of the second gasket material on the back of the second gasket layer is preferably in the range of 25.0% to 100.0%, very preferably in the range of 50.0% and 100.0% and in particular in the range of 75.0% to 100.0%, based on the total surface of the contact area of the at least one recess in the first gasket layer and of the at least one recess in the second gasket layer. Thereby the contact area of the second gasket material on the front of the first gasket layer and of the second gasket material on the back of the second gasket layer is the area by which the gasket material on the front of the first gasket layer is in contact with the gasket material on the back of the second gasket layer. The contact area of the at least one recess in the first gasket layer and of the at least one recess in the second gasket layer is the area by which the at least one recess in the first gasket layer is in contact with the at least one recess in the second gasket layer. The surface area of the contact area of the at least one recess in the first gasket layer and of the at least one recess in the second gasket layer a recess is measured perpendicular to the surface of the gasket layer.

According to another aspect of the present invention it is particularly preferred that the contact area of the second gasket material on the front of the first gasket layer and the contact area of the second gasket material on the back of the second gasket layer comprise a hole inside the contact area. By the use of this hole, for example, gases may be conducted through the membrane electrode assembly without adversely affecting the function of the membrane electrode assembly.

The following figures further illustrate the present invention. However they are not intended to limit the scope of what the inventors regard as their invention.

Figure 1:
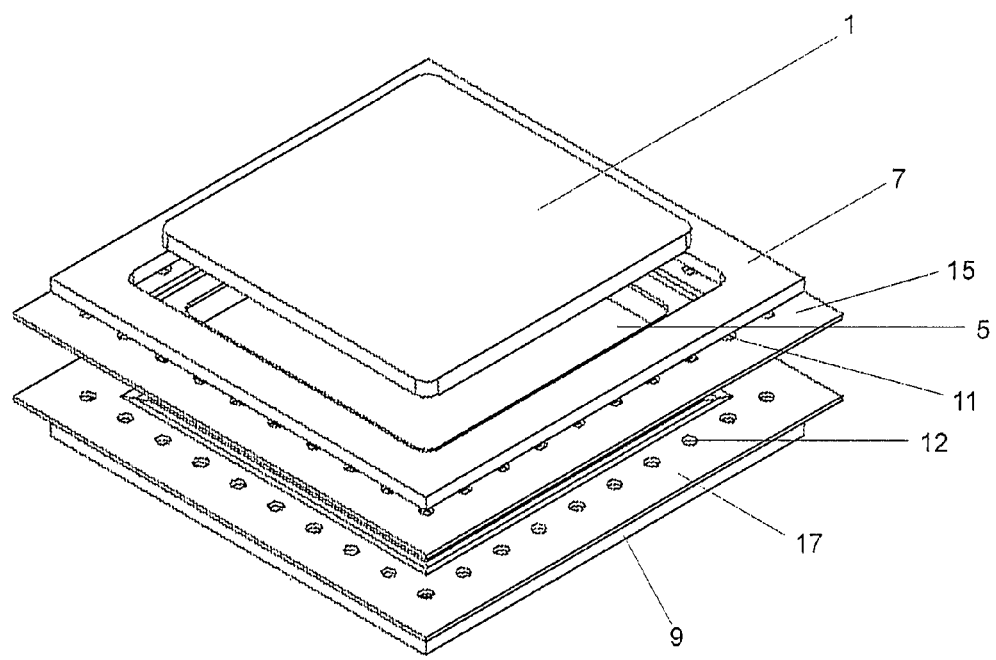
FIG. 1 shows a perspective exploded view of a preferred embodiment of the membrane electrode assembly.

The preferred embodiment of the present invention shown in FIG. 1 comprises two electrochemically active electrodes (1, 3) separated by a polymer electrolyte membrane (5). The surfaces of polymer electrolyte membrane (5) are in contact with the electrodes (1, 3) in such a way that the first electrode (1) partially covers the front of the polymer electrolyte membrane (5; visible surface) and the second electrode (3) partially covers the back of the polymer electrolyte membrane (5; not visible).

In the following the area of the polymer electrolyte membrane (5) covered by the electrodes (1, 3) is referred to as the inner area and the area of the polymer electrolyte membrane (5) not covered by the electrodes (1, 3) is referred to as the outer area.

The membrane electrode assembly further comprises two gasket layers (15, 17) each having the form of a frame and covering the outer area of the polymer electrolyte membrane (5) wherein the first gasket layer (15) partially covers the front of the polymer electrolyte membrane (5) and the second gasket layer (17) partially covers the back of the polymer electrolyte membrane (5).

In addition the membrane electrode assembly also comprises a second gasket materials (7, 9) on the front of the first gasket layer (15) and on the back of the second gasket layer (17).

Each of the gasket layers (15, 17) comprises several recesses (11, 12), which are presently provided in the form of holes and which are located in regular distances one to another.

The second gasket material (9) on the back of second gasket layer (17) comprises several protruding projections (13). These protruding projections (13) are also made of the second gasket material and are located on the side facing the polymer electrolyte membrane (5). The form, the size and the position of the protruding projections on the second gasket material (9) are in a way that the protruding projections (13) fit through the recesses (11, 12) running through the first gasket layer (15) and the second gasket layer (17) and may join the second gasket material (9) on the back of the second gasket layer (17) to the second gasket material (7) on the front of the first gasket layer (15). Therefore in a top view the area of the protruding projections (13) is smaller or equal to both the area of the recesses (11) running through the first gasket layer (15) and the recesses (12) running through the second gasket layer (17). In addition the height of the protruding projections (13) is at least equal to the sum of the thickness (perpendicular) of polymer electrolyte membrane (5), the thickness (perpendicular) of the first gasket layer (15) and the thickness (perpendicular) of the second gasket layer (17) so that the protruding projections (13) may join the second gasket materials (7, 9) on the front of the first gasket layer (15) and on the back of the second gasket layer (17). In addition the positions of the protruding projections (13) on the front of the gasket material (9) corresponds to the positions of the recesses (11) running through the first gasket layer (15) and the recesses (12) running through the second gasket layer (17).

Figure 2:
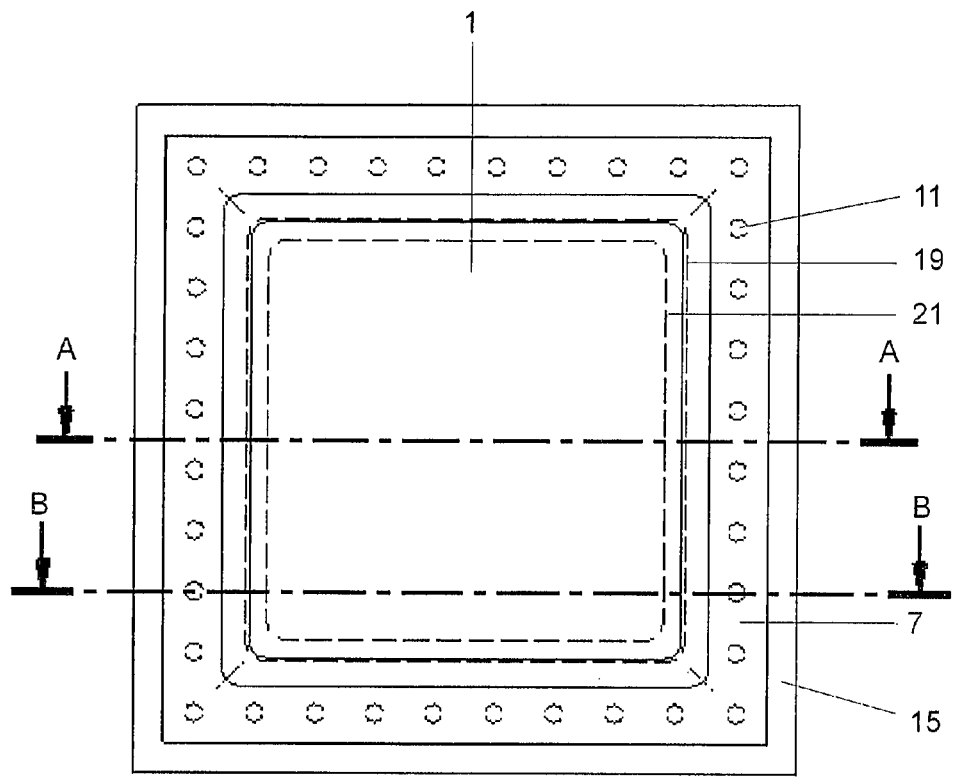
FIG. 2 shows a top view of a preferred embodiment of the membrane electrode assembly.

FIG. 2 shows a top view of the membrane electrode assembly. The front of the polymer electrolyte membrane (5; indicated by the dashed line 19) is covered by two gasket layers (15, 17) each having the form of a frame and covering the outer area of the polymer electrolyte membrane (5) wherein the first gasket layer (15; inner border indicated by the dashed line 21) also partially covers the front of the polymer electrolyte membrane (5) and the second gasket layer (17; not shown) partially covers the back of the polymer electrolyte membrane (5). The first electrode (1) is located on top of the polymer electrolyte membrane (5) and the first gasket layer (15) and therefore covers the inner area of the polymer electrolyte membrane (5) and also partially covers the first gasket layer (15). The second gasket layer (17; not shown) and the second electrode (3; not shown) are symmetrically located on the back of the polymer electrolyte membrane (5).

The recesses (11) in the first gasket layer (15) are covered by the second gasket material (7). Thereby the second gasket material (7) is preferably applied to the front of the first gasket layer (15) in a way that it is not in contact with the electrode (1) at any location. The gap between the first electrode (1) and the second gasket material (7) best possibly avoids the build-up of mechanical stresses during heating of the membrane electrode assembly, which may result from different thermal coefficient of expansion of the electrode material and the second gasket materials.

For similar reasons the second gasket material (9) is preferably applied to the back of the second gasket layer (17) in a way that it is not in contact with the electrode (3) at any location (not visible in FIG. 2).

Figure 3:
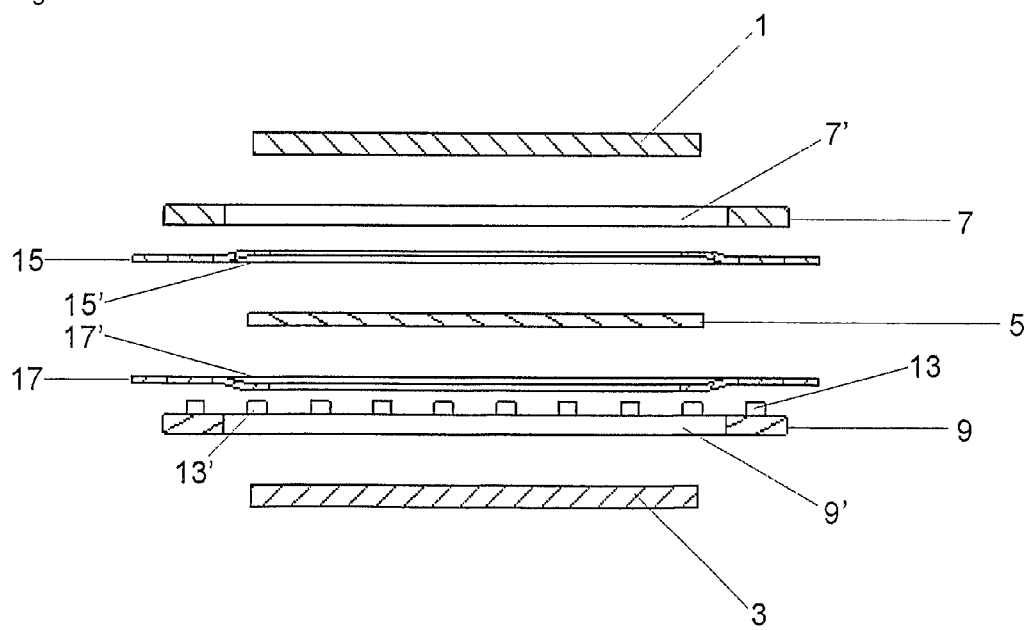
FIG. 3 shows a first side view of a preferred embodiment of the membrane electrode assembly in form of an exploded cross-section.
Figure 4:
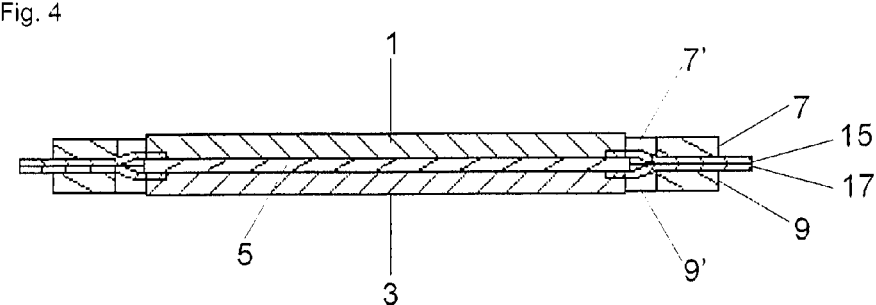
FIG. 4 shows a second side view of a preferred embodiment of the membrane electrode assembly in form of a cross-section.

The FIG. 3 (exploded view) and FIG. 4 show cross-sectional views of the membrane electrode assembly wherein the section is perpendicular to the surface of the polymer electrolyte membrane (5) along the plane A (indicated in FIG. 2) which intersects with the first gasket layer (15) and the polymer electrolyte membrane (5) but not with any of the recesses (11) in the first gasket layer (15).

In FIG. 3 the first gasket layer (15) and the second gasket layer (17) have both the form of a bowl so that they can partially enclose the polymer electrolyte membrane (5). The gasket material (7) above the first gasket layer (15) and the gasket material (7) below the second gasket layer/(17) comprise recesses which may enclose the electrodes (1, 3). In addition the second gasket materials (7', 9'), the protruding projections (13') and parts of the first and the second gasket layer (15', 17') may be seen, which are behind the intersecting plane A (non hatched elements).

When assembling, the recess in the second gasket material (7) encloses the first electrode (1), the recess in the second gasket material (9) encloses the second electrode (3) and the first gasket layer (15) and the second gasket layer (17) enclose the polymer electrolyte membrane (5). The elements behind the plane A (7', 9', 13', 15', 17') are mostly covered by the electrodes (1, 3), the polymer electrolyte membrane (5) and the second gasket material (7). Second gasket materials (7', 9') behind the plane A can merely be seen between the first electrode (1) and the second gasket material (7) and between the second electrode (3) and the second gasket material (9).

Figure 5:
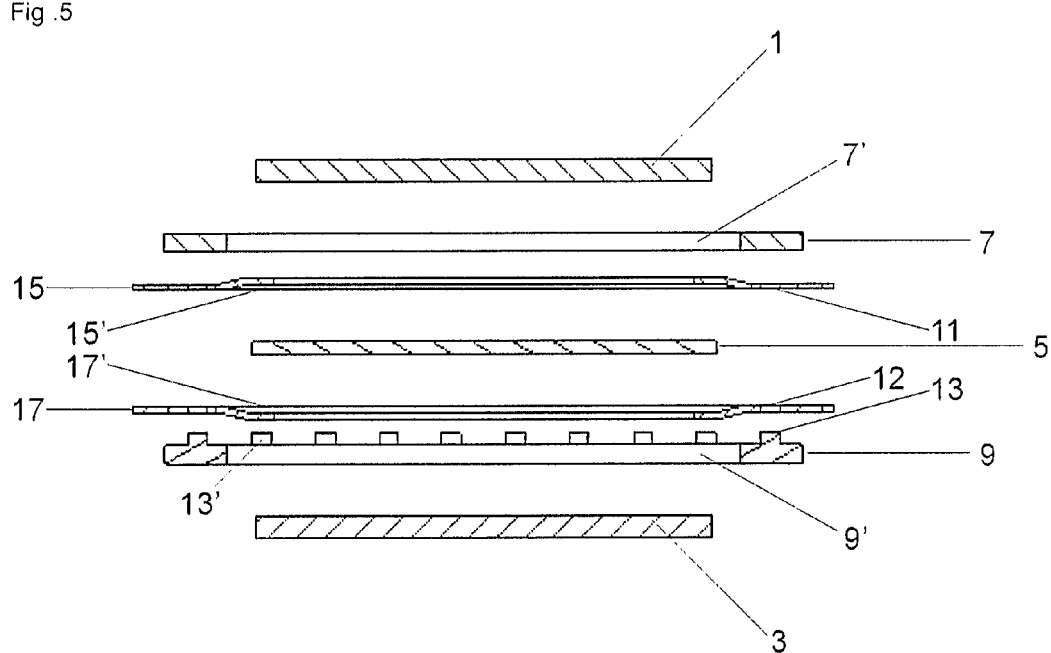
FIG. 5 shows a third side view of a preferred embodiment of the membrane electrode assembly in form of an exploded cross-section.
Figure 6:
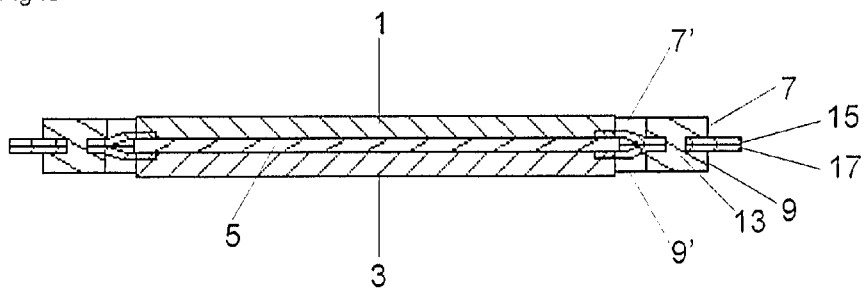
FIG. 6 shows a fourth side view of a preferred embodiment of the membrane electrode assembly in form of a cross-section.

The FIG. 5 (exploded view) and FIG. 6 show cross-sectional views of the membrane electrode assembly wherein the section is perpendicular to the surface of the polymer electrolyte membrane (5) along the plane B (indicated in FIG. 2) which intersects with the first gasket layer (15) and the polymer electrolyte membrane (5) and with two of the recesses (11) in the first gasket layer (15) which are separated one from another by the inner area (view direction along plane B).

In FIG. 5 the first gasket layer (15) and the second gasket layer (17) both have the form of a bowl so that they can partially enclose the polymer electrolyte membrane (5). The gasket material (7) above the first gasket layer (15) and the gasket material (7) below the second gasket layer (17) comprise recesses which may enclose the electrodes (1, 3). In addition the second gasket material (9) comprises protruding projections (13) and the first gasket layer (15) and the second gasket layer (17) comprise recesses (11, 12), which may enclose the protruding projections (13). Furthermore the second gasket materials (7', 9'), the protruding projections (13') and parts of the first and the second gasket layer (15', 17') may be seen, which are behind the intersecting plane A (non hatched elements).

When assembling, the recess in the second gasket material (7) encloses the first electrode (1), the recess in the second gasket material (9) encloses the second electrode (3) and the first gasket layer (15) and the second gasket layer (17) enclose the polymer electrolyte membrane (5). In addition the recesses (11, 12) in the first gasket layer (15) and in the second gasket layer (17) enclose the protruding projections (13) so that the second gasket material (7) is joined to the second gasket material (9) by the protruding projections (13). The elements behind the plane A (7', 9', 13', 15', 17') are mostly covered by the electrodes (1, 3), the polymer electrolyte membrane (5) and the second gasket material (7). Second gasket materials (7', 9') behind the plane A can merely be seen between the first electrode (1) and the second gasket material (7) and between the second electrode (3) and the second gasket material (9).

Even though in the previous described embodiments the second gasket materials (7, 9) are joined one to another by protruding projections (13) made before the assembly of the membrane electrode assembly, the present invention is not restricted to this very special method of preparation. By the way of contrast, according to a very preferred embodiment of the present invention the second gasket materials (7, 9) are joined to one another by protruding projections formed not until the membrane electrode assembly is assembled.

Figure 7:
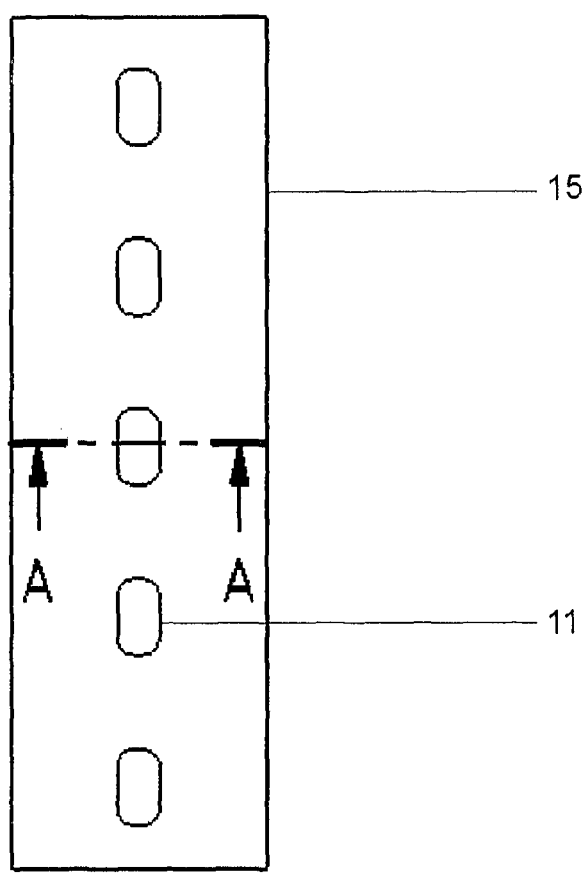
FIG. 7 shows a top view of a section of a preferred embodiment of the membrane electrode assembly before the application of the second gasket material.
Figure 8:
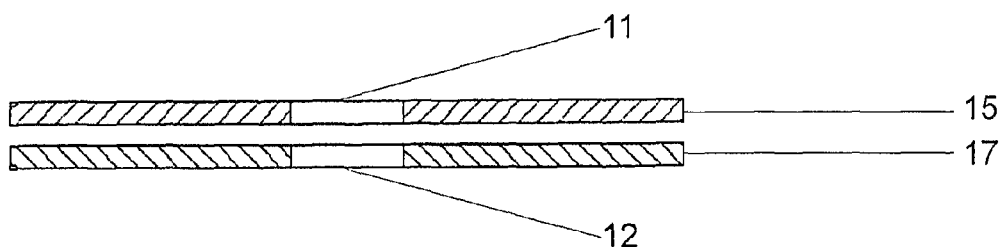
FIG. 8 shows a cross-sectional view of a section of a preferred embodiment of the membrane electrode assembly before the application of the second gasket material.

In FIG. 7 to FIG. 11 a very preferred way of preparation of the membrane electrode assembly is illustrated in more detail. FIG. 7 (top view) and FIG. 8 (cross-section along plane A) show a section of the first gasket layer (15) comprising at several, preferably oval, recesses (11) located at regular distances one to another. The second gasket (17; not visible in FIG. 7) is lying below the first gasket layer and also comprises recesses (12) located at same positions as the recesses in the first gasket layer (15).

Figure 9:
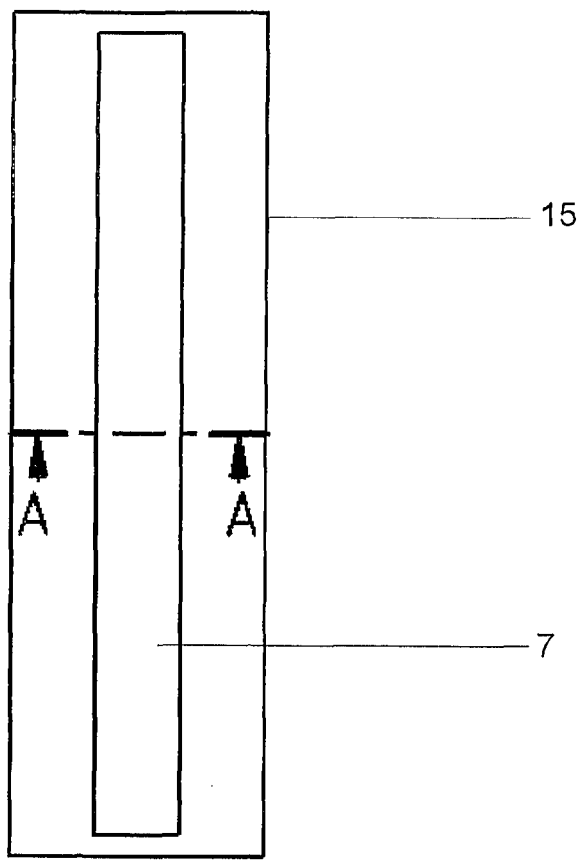
FIG. 9 shows a top view of a section of a preferred embodiment of the membrane electrode assembly after the application of the second gasket material.
Figure 10:
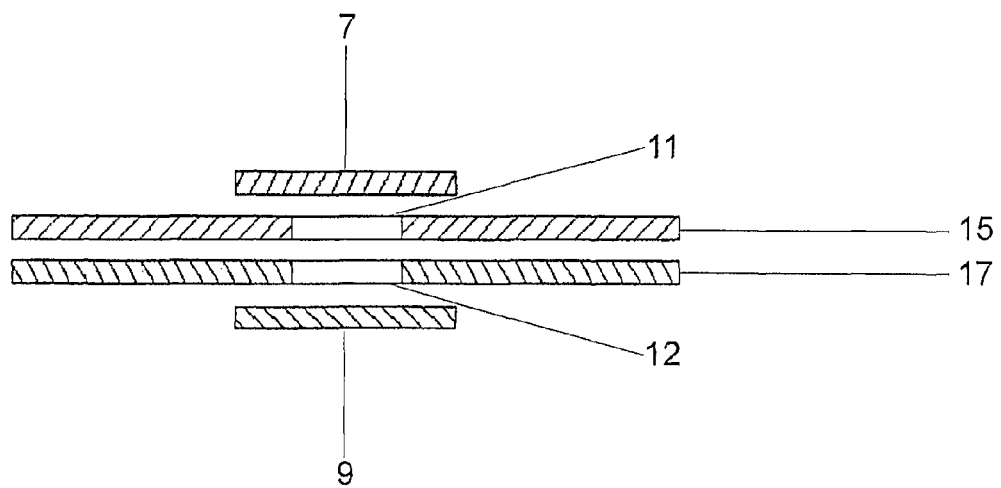
FIG. 10 shows a cross-sectional view of a section of a preferred embodiment of the membrane electrode assembly after the application of the second gasket material, but before the second gasket materials are joined to one another.
Figure 11:
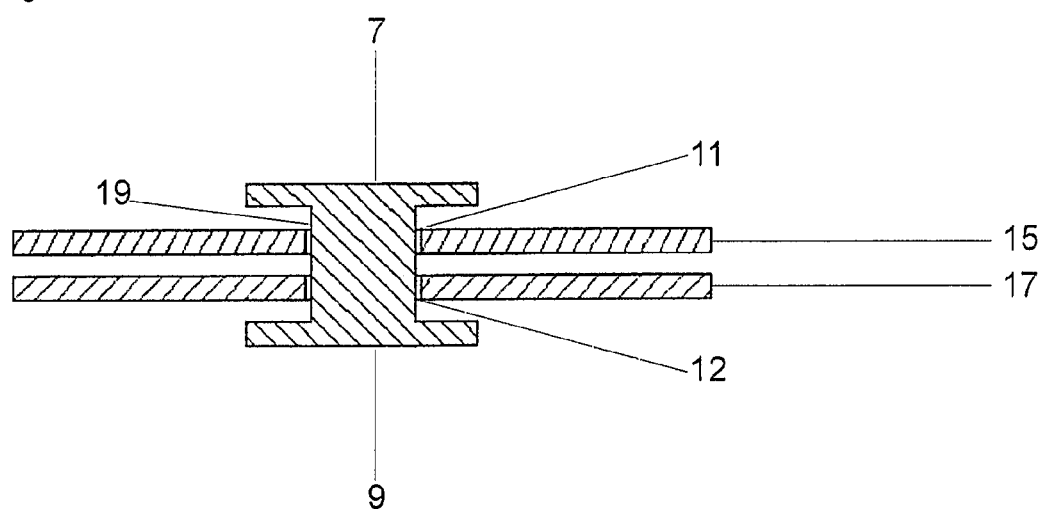
FIG. 11 shows a cross-sectional view of a section of a preferred embodiment of the membrane electrode assembly after the application of the second gasket material and after the second gasket materials are joined one to another.

The manufacture of the membrane electrode assembly according to the present invention is shown in the FIG. 9 (top view), FIG. 10 (cross-section along plane A) and FIG. 11 (cross-section along plane A). First the second gasket materials (7, 9) are applied to the front of the first gasket layer (15) and the back of the second gasket layer (17) in a way that the second gasket material (7) covers the front end of the recesses (11) running through the first gasket layer (15) and the second gasket material (9) covers the back end of the recesses (12) running through the second gasket layer (17). Thereafter the second gasket material (19) flows into the recesses (11, 12) and join the second gasket materials one to another.

The production of the membrane electrode assemblies of the present invention is obvious to the person skilled in the art. Generally speaking, the various components of the membrane electrode assembly are placed on top of one another and joined to one another by pressure and temperature. Lamination takes place generally at a temperature in the range from 10 to 300° C., in particular from 20° C. to 200°, and with a pressure in the range from 1 to 1000 bar, in particular from 3 to 300 bar.

One preferred embodiment can be produced, for example, by first manufacturing a frame from a film of a first gasket material. This frame is subsequently placed on a made-up electrode coated with a catalyst, platinum for example, the frame overlapping with the electrode. The amount of overlap is preferably from 0.2 to 5 mm. A metal plate having the same shape and size as the gasket film is then placed onto the film frame; in other words, it does not cover the free electrode area. By this means it is possible to compress the mask and the underlying part of the electrode to form an intimate assembly without damaging the electrochemically active area of the electrode. By means of the metal plate the gasket frame is laminated with the electrode under the conditions specified above.

To produce a membrane electrode assembly of the invention a polymer electrolyte membrane is placed between two of the above-obtained gasket frame electrode units. Subsequently an assembly is produced by means of pressure and temperature.

After cooling, the finished membrane electrode assembly (membrane electrode assembly) is provided with the second gasket material.

According to a first preferred embodiment of the present invention the manufacture of the membrane electrode assembly of the present invention comprises the steps of:

i) providing each of the gasket layers with at least one recess at one or more locations, wherein at least one recess, preferably all recesses, in the first gasket layer is in contact with at least one, preferably all, recesses in the second gasket layer;

ii) partially or totally filling the at least one recess in the first and in the second gasket layer with the second gasket material; and iii) applying the second gasket material on the front of the first gasket layer and on the back of the second gasket layer, wherein the steps ii) and iii) are performed in such a way that the second gasket material in the at least one recess in the first gasket layer and the second gasket material in the at least one recess in the second gasket layer joins the second gasket material on the front of the first gasket layer to the second gasket material on the back of the second gasket layer. Preferably the steps ii) and iii) are performed in such a way that the second gasket material on the front of the first gasket layer and the second gasket material on the back of the second gasket layer form one piece.

In step i) any method known in the art may be used. However it is very advantageous to cut the at least one recess in the first and in the second gasket layer. In addition the gasket layers are preferably provided with one or more recesses perpendicular to the surface of the gasket layer.

In step ii) and step iii) any method known in the art may be used, as long as the aim is achieved that the second gasket material in the at least one recess in the first gasket layer and the second gasket material in the at least one recess in the second gasket layer join the second gasket material on the front of the first gasket layer to the second gasket material on the back of the second gasket layer. Therefore the second gasket material is preferably applied on the front of the first gasket layer and on the back of the second gasket layer in such a way that it at least partially, preferably totally covers the front end of at least one recess in first gasket layer and the back end of at least one recess in the second gasket layer wherein the recess in first gasket layer and the recess in second gasket layer are in contact to one another. If both gasket layers comprise more than one recess it might possibly be sufficient that the second gasket material on the front of the first gasket layer and the second gasket material on the back of the second gasket layer is joined to one another through at least one recess in the first gasket layer and at least one recess in the second gasket layer.

The partially or totally filling of the at least one recess in the first gasket layer and of the at least one recess in the second gasket layer with the second gasket material and the application of the second gasket material on the front of the first gasket layer and on the back of the second gasket layer is preferably achieved by thermoplastic processing in the viscoelastic state. In that context the use of compression and/or injection moulding processes, in particular the use of compression moulding processes, has proven particular advantageous. A very preferred method is as follows:

At first mouldings for the front of the first gasket layer and for the back of the second gasket layer are prepared, wherein each of the mouldings are provided with one or more recesses, preferably open channels, for the second gasket material. The form, the size and the position of the recesses is selected in a way to optimize the sealing effect of the resulting cell and to provide a cell having the desired contact area of the electrodes and the polymer electrolyte membrane. Preferably the layout of the second moulding is a mirror image of the layout of the first moulding.

Simultaneously a membrane electrode assembly is prepared which comprises two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode. Each of the gasket layers comprises at least one recess wherein the at least one recess in the first gasket layer is preferably in contact with the at least one recess in the second gasket layer.

The manufacture of the membrane electrode assembly of the present invention comprises the step of:

a) filling the at least one recess in the moulding for the back of the second gasket layer with a melt of the second gasket material;

b) laying the membrane electrode assembly described above on the moulding in such a way that the melt of the second gasket material is in contact with the back of the second gasket layer and the back end of the at least one recess in second gasket layer is in contact with the melt of the second gasket material;

c) at least partially filling the at least one recess in the first gasket layer and the at least one recess in the second gasket layer with the melt of the second gasket material;

d) filling the at least one recess in the moulding for the front of the first gasket layer with the melt of the second gasket material;

e) laying the moulding for the front of the first gasket layer on the front of the first gasket material in such a way that the melt of the second gasket material in the moulding for the front of the first gasket layer is in contact with the front of the second gasket layer and the front end of the at least one recess in the first gasket layer is in contact with the melt of the second gasket material in the moulding for the front of the first gasket layer;

f) cooling the combination of the moulding for the back of the second gasket layer, the membrane electrode assembly and the moulding for the front of the first gasket layer in a way that the melt of the second gasket material solidifies, wherein a pressure is preferably applied.

After cooling, the resulting membrane electrode assembly is ready for operation and can be used in a fuel cell.

According to a second preferred embodiment of the present invention the second gasket material is applied on the front of the first gasket layer and on the back of the second gasket layer by the use of an extrusion process. Again a membrane electrode assembly is prepared which comprises two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode. Each of the gasket layers comprises at least one recess wherein said at a least one recess in the first gasket layer is preferably in contact with said at least one recess in the second gasket layer.

The second gasket material is preferably extruded and applied on the front of the first gasket layer and on the back of the second gasket layer in such a way that the second gasket material covers at least one recess in the first gasket layer and in the second gasket layer wherein the at least one recess in the first gasket layer and the at least one recess in the second gasket layer are preferably in contact to one another. In the next step the second gasket material and the membrane electrode assembly are laminated in a way that the second gasket material on the front of the first gasket layer and the gasket material on the back of the second gasket layer are in contact to one another.

According to a third preferred embodiment of the present invention the production of the membrane electrode assembly according to the present invention comprises the preparation of a membrane electrode assembly comprising two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode.

In the next step the second gasket material is applied on the front of the first gasket layer and on the back of the second gasket layer and the combination of the gasket layers and the second gasket material on these layers is provided with at least one recess, preferably at least one hole, running through the second gasket material on the front of the first gasket layer and on the back of the second gasket layer and through the first gasket layer and the second gasket layer. This at least one recess is finally at least partially filled with the second gasket material, thereby joining the second gasket material on the front of the first gasket layer to the second gasket material on the back of the second gasket layer. Preferably the filling of the recess with the second gasket material is carried out simultaneously to the formation of the recess by making the recess by the use of a hollow moulding and by at least partially filling the recess during the removal of the hollow moulding by conducting the second gasket material through the inner of the moulding into the recess.

According to a fourth preferred embodiment of the present invention the production of the membrane electrode assembly according to the present invention comprises the preparation of a membrane electrode assembly comprising two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode.

In the next step the membrane electrode assembly is laid in a suitable moulding and is provided with at least one recess, preferably at least one hole, running through the second gasket material on the front of the first gasket layer and on the back of the second gasket layer and through the first gasket layer and the second gasket layer. After that the second gasket material is applied on the front of the first gasket layer and on the back of the second gasket layer. Preferably the application of the second gasket material is carried out simultaneously to the making of the at least on recess by making the at least on recess by the use of a hollow moulding and by directly filling the at least one recess made with the second gasket material conducted into the recess through the inner of the moulding.

According to a fifth preferred embodiment of the present invention the production of the membrane electrode assembly according to the present invention comprises the preparation of a membrane electrode assembly comprising two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode.

In the next step the membrane electrode assembly is laid in a suitable moulding and is provided with at least one recess, preferably at least one hole, running through the first gasket layer and through the second gasket layer. After that pre-moulded second gasket material is applied on the front of the first gasket layer and on the back of the second gasket layer wherein the pre-moulded gasket material applied to the back of the second gasket layer comprises one or more protruding projections. These one or more protruding projections are also made of the second gasket material and are located on the side facing the polymer electrolyte membrane. The form, the size and the position of the one or more protruding projections are in a way that the protruding projections fit through the one or more recesses running through the first gasket layer and the second gasket layer and may join the second gasket material on the back of the second gasket layer to the second gasket material on the front of the first gasket layer. Preferably the protruding projections of the second gasket material on the back of the second gasket layer are welded with the second gasket material on the front of the first gasket layer.

In this embodiment it is very preferred that the second gasket material applied to the front of the first gasket layer comprises one or more recesses, preferably one or more holes, which may enclose the protruding projections of the second gasket material applied on the back of the second gasket material. The build of the membrane electrode assembly is achieved by plugging the protruding projections through the one or more recesses running through the first and the second gasket layer and by joining the protruding projections to the second gasket material in the front of the first gasket layer, preferably by welding.

According to a sixth preferred embodiment of the present invention the production of the membrane electrode assembly according to the present invention comprises the preparation of a membrane electrode assembly comprising two electrochemically active electrodes separated by a polymer electrolyte membrane wherein the surfaces of the polymer electrolyte membrane are in contact with the electrodes in such a way that the first electrode partially or totally, preferably partially, covers the front of the polymer electrolyte membrane and the second electrode partially or totally, preferably partially, covers the back of the polymer electrolyte membrane. The membrane electrode assembly additionally comprises two gasket layers made of a first gasket material wherein the first gasket layer partially covers the front of the polymer electrolyte membrane and/or the first electrode and the second gasket layer partially covers the back of the polymer electrolyte membrane and/or the second electrode.

In the next step the membrane electrode assembly is laid in a suitable moulding and is provided with at least one recess, preferably at least one hole, running through the first gasket layer and through the second gasket layer. After that pre-moulded second gasket material is applied in the front of the first gasket layer and on the back of the second gasket layer wherein the pre-moulded gasket material applied to the front of the first gasket layer comprises one or more protruding projections and the pre-moulded gasket material applied to the back of the second gasket layer comprises one or more protruding projections. These one or more protruding projections are also made of the second gasket material and are located on the side facing the polymer electrolyte membrane. The form, the size and the position of the one or more protruding projections are in a way that the protruding projections fit through the one or more recesses running through the first gasket layer and the second gasket layer and may join the second gasket material on the back of the second gasket layer to the second gasket material on the front of the first gasket layer. Preferably the protruding projections of the second gasket material in the front of the first gasket layer are welded with the second gasket material on the back of the second gasket layer and the protruding projections of the second gasket material on the back of the second gasket layer are welded with the second gasket material in the front of the first gasket layer.

In this embodiment it is very preferred that the second gasket material applied to the front of the first gasket layer comprises one or more recesses, preferably one or more holes, which may enclose the protruding projections of the second gasket material applied on the back of the second gasket material and that the second gasket material applied to the back of the second gasket layer comprises one or more recesses, preferably one or more holes, which may enclose the protruding projections of the second gasket material applied in the front of the first gasket material. The build of the membrane electrode assembly is achieved by plugging the protruding projections through the one or more recesses running through the first and the second gasket layer and by joining the protruding projections to the second gasket material in the front of the first gasket layer, preferably by welding, and by plugging the protruding projections through the one or more recesses running through the first and the second gasket layer and by joining the protruding projections to the second gasket material on the back of the second gasket layer, preferably by welding.

A particularly surprising finding was that, owing to their dimensional stability under fluctuating ambient temperatures and atmospheric humidity, membrane electrode assemblies of the invention can be stored or dispatched without problems. Even after prolonged storage or after dispatch to sites having very different climatic conditions, the dimensions of the membrane electrode assembly are in agreement, with no problems for incorporation into fuel cell stacks. In that case, for external incorporation, there is no longer any need to condition the membrane electrode assembly on site, thereby simplifying the production of the fuel cell and saving on time and costs.

One advantage of the membrane electrode assemblies of the invention is that they allow the fuel cell to be operated at temperatures above 120° C. This applies to gaseous and liquid fuels, such as hydrogen-containing gases, which are produced, for example, from hydrocarbons in an upstream reforming step. The oxidant used in that case may be oxygen or water, for example.

A further advantage of the membrane electrode assemblies of the invention is that, on operation above 120° C., they exhibit a high tolerance toward carbon monoxide even with pure platinum catalysts, i.e., without a further alloying component. At temperatures of 160° C., for example, it is possible for there to be at least 1% CO in the fuel gas without this leading to a noticeable reduction in the performance of the fuel cell.

The membrane electrode assemblies of the invention can be operated in fuel cells without any need to moisten the fuel gases and the oxidants, despite the possibly high operating temperatures. The fuel cell nevertheless operates stably and the membrane does not lose its conductivity. This simplifies the entire fuel cell system and brings additional cost savings, since the management of the water circulation is simplified. Moreover, this also improves the behavior of the fuel cell system at temperatures below 0° C.

The membrane electrode assemblies of the invention surprisingly allow the fuel cells to be cooled without problems to room temperature or below and then to be started up again without losing performance. Conventional fuel cells based on phosphoric acid, in contrast, always have to be held at a temperature above 80° C. when the fuel cell is switched off, in order to avoid irreversible damage.

Furthermore, the membrane electrode assemblies of the present invention exhibit a very high long-term stability. It has been found that a fuel cell of the invention can be operated continuously over long periods of more than 5000 hours, for example, at temperatures of more than 120° C. with dry reaction gases without any finding of a marked deterioration in performance being possible. The power densities which can be achieved in this context are very high even after such a long period of time.

The fuel cells in accordance with the present invention show a high voltage which is of preferably at least 2000 mV after a long time, e.g. after more than 5000 hours. For the measurement of the voltage a fuel cell having a hydrogen-flow on the anode and an air-flow on the cathode is operated without current. The measurement takes place by switching the fuel cell current from 0.2 A/cm$^2$ to the state without current and then recording the voltage for 52 minutes. The value after 5 minutes is the corresponding rest voltage. The measured values of the voltage are valid for a temperature of 160° C. In addition after this time the fuel cell preferably shows a small gas cross-over. For the measurement of the cross-over the anode of the fuel cell is operated with hydrogen (5 L/h), and the cathode with nitrogen (5 L/h). The anode is used as reference and counter electrode. The cathode as working electrode. The cathode is put onto a potential of 0.5 V and the hydrogen diffusing through the membrane is oxidized at the cathode, wherein the oxidation is mass transportation limited. The resultant current is a measure of the hydrogen permeation rate. The current is <3 mA/cm$^2$, preferably <2 mA/cm$^2$, especially preferred <1 mA/cm$^2$ in a 50 cm$^2$ cell. The measured values of the H$_2$-cross-over-voltage hold for a temperature of 160° C.

The membrane electrode assemblies of the invention can be produced inexpensively and simply, moreover.

The present design prevents an over compression of the membrane electrode assembly components, which may reduce the lifetime of the membrane electrode assembly.

The membrane electrode assembly of the present invention can be sealed with separator plates via a compression seal or an adhesive seal, wherein the seal will prevent coolant and/or gas leakage to the membrane electrode assembly and from the fuel cell stack.

The present invention provides a more rigid and robust membrane electrode assembly design, which is less susceptible to mis-use and mis-handling.

In addition the present invention provides an easier means of automated assembly of a fuel cell stack, by eliminating parts (i.e. separate gasket pieces or layers).

For further information on membrane electrode assemblies refer to the technical literature, in particular to U.S. Pat. Nos. 4,191,618, 4,212,714 and 4,333,805. The disclosure content contained in the aforementioned references [U.S. Pat. Nos. 4,191,618, 4,212,714 and 4,333,805] concerning the construction and production of membrane electrode assemblies and also concerning the electrodes to be chosen, gas diffusion layers and catalysts, is also part of the description.

The invention claimed is:

1. A membrane electrode assembly comprising
   a) two electrochemically active electrodes (1, 3) separated by a polymer electrolyte membrane (5) having a front and a back wherein the surfaces of the polymer electrolyte membrane (5) are in contact with the electrodes (1, 3) in such a way that the first electrode (1) partially or totally covers the front of the polymer electrolyte membrane (5) and the second electrode (3) partially or totally covers the back of the polymer electrolyte membrane (5);
   b) two gasket layers (15, 17) made of a first gasket film wherein the first gasket layer (15) is a frame which partially covers the front of the polymer electrolyte membrane (5) and the first electrode (1) and has a front, and the second gasket layer (17) is a frame which partially covers the back of the polymer electrolyte membrane (5) and the second electrode (3) and has a back;
   characterized in that
   the membrane electrode assembly also comprises a second gasket material (7, 9) on the front of the first gasket layer (15) and on the back of the second gasket layer (17);
   each of the gasket layers (15, 17) forming a frame on the polymer electrolyte membrane (5) and comprises at least one recess (11, 12);
   the second gasket material (7) on the front of first gasket layer (15) is in contact with the second gasket material (9) on the back of the second gasket layer (17) through the at least one recess (11) in the first gasket layer (15) and the at least one recess (12) in the second gasket layer (17);
   the polymer electrolyte membrane (5) is doped with an acid and comprises polyazoles;
   the two gasket layers (15, 17) extend beyond the membrane (5), are in flat contact with one another, and are welded to one another.

2. The membrane electrode assembly of claim 1, characterized in that the at least one recess (11) in the first gasket layer (15) is a hole through the first gasket layer (15) and the at least one recess (12) in the second gasket layer (17) is a hole through the second gasket layer (17).

3. The membrane electrode assembly of claim 1, characterized in that the first gasket material film is a polyimide.

4. The membrane electrode assembly of claim 1, characterized in that the thickness of the gasket layers (15, 17) is in the range from 5 μm to 1000 μm.

5. The membrane electrode assembly of claim 1, characterized in that at least one of the gasket layers (15, 17) is in contact with at least one of the electrodes (1, 3).

6. The membrane electrode assembly of claim 5, characterized in that the surfaces of the polymer electrolyte membrane (5) are completely covered by the two electrodes (1, 3) and the gasket layers (15, 17).

7. The membrane electrode assembly of claim 5, characterized in that the contact area of the electrodes (1, 3) to the gasket layers (15, 17) is provided with fluoropolymer.

8. The membrane electrode assembly of claim 7, characterized in that the fluoropolymer is FEP.

9. The membrane electrode assembly of claim 1, characterized in that the second gasket material (7, 9) is a thermoplastically processable material.

10. The membrane electrode assembly of claim 9, characterized in that the second gasket material (7, 9) is a fluoropolymer.

11. The membrane electrode assembly of claim 1, characterized in that the second gasket material (7, 9) is in contact with electrically conducting separator plates.

12. The membrane electrode assembly of claim 1, characterized in that the polymer electrolyte membrane (5) is doped with phosphoric acid.

13. The membrane electrode assembly of claim 12, characterized in that the concentration of the phosphoric acid is at least 50% by weight %.

14. The membrane electrode assembly of claim 1, characterized in that the polymer electrolyte membrane (5) is obtainable by a method comprising the steps of
   A) mixing one or more aromatic tetraamino compounds with one or more aromatic carboxylic acids and/or esters thereof containing at least two acid groups per carboxylic acid monomer, or mixing one or more aromatic and/or heteroaromatic diaminocarboxylic acids in polyphosphoric acid to form a solution and/or dispersion,
   B) applying a layer using the mixture according to step A) to a support or to an electrode,
   C) heating the sheetlike structure/layer obtainable according to step B) under inert gas to temperatures of up to 350° C., to form the polyazole polymer,
   D) treating the membrane formed in step C) until it is self-supporting.

15. The membrane electrode assembly of claim 12, characterized in that the degree of doping is between 3 and 50% by weight %.

16. The membrane electrode assembly of claim 1, characterized in that the polymer electrolyte membrane (5) comprises one or more polymer(s) obtainable by a polymerization of monomers comprising phosphonic acid groups and/or of monomers comprising sulfuric acid groups.

17. The membrane electrode assembly of claim 1, characterized in that at least one of the electrodes (1, 3) is made of a compressible material.

18. A fuel cell comprising at least one membrane electrode assembly according to claim 1.

19. The membrane electrode assembly according to claim 1 wherein the first gasket film consisting of poly (tetrafluoroethylene-co-hexafluoropropylene), polyvinylidene fluoride, perfluoro alkoxypolymer, poly (tetrafluoroethylene-co-perfluoromethylenevinylether), dipolymers of vinylidenefluoride Hexafluoropropylene, terpolymers of vinylidenefluoride/hexafluoropropylene/tetrafluoroethylene, copolymers of tetrafluoroethylene/propylene and of ethylene/tetrafluoroethylene/perfluoromethylvinylether, polyketones, polyetherketones, polyetherketones, polyetheretherketones, polyetheretherketoneketones, polyethersulfones, polysulfones, polyphenylenesulfones, polyphenylenesulfides, polyphenyloxydes, liquid-crystalline polymers, polyimides, polyetherimides, polyamideimides and/or polyphenylenquinoxalines.

20. The membrane electrode assembly according to claim 1 wherein the first gasket film comprising: a first layer consisting of poly (tetrafluoroethylene-co-hexafluoropropylene), polyvinylidene fluoride, perfluoro alkoxypolymer, poly (tetrafluoroethylene-co-perfluoromethylenevinylether), dipolymers of vinylidenefluoride/Hexafluoropropylene, terpolymers of vinylidenefluoride/hexafluoropropylene/tetrafluoroethylene, copolymers of tetrafluoroethylene/propylene and of ethylene/tetrafluoroethylene/perfluoromethylvinylether, polyketones, polyetherketones, polyetheretherketones, polyetheretherketoneketones, polyethersulfones, polysulfones, polyphenylenesulfones, polyphenylenesulfides, polyphenyloxydes, liquid-crystalline polymers, polyimides, polyetherimides, polyamideimides and/or polyphenylenquinoxalines; and a second layer of a fluoropolymer.

* * * * *